(12) United States Patent
Chen et al.

(10) Patent No.: US 10,664,682 B2
(45) Date of Patent: May 26, 2020

(54) IMAGE QUALITY IN A FINGERPRINT DETECTING APPARATUS AND METHOD

(71) Applicant: Image Match Design Inc., Zhubei (TW)

(72) Inventors: Zhieng-Chung Chen, Hsinchu (TW); Po-Shien Chu, Xinfeng Township (TW)

(73) Assignee: Image Match Design Inc., Zhubei, Hsinchu County (TW)

( * ) Notice: Subject to any disclaimer, the term of this patent is extended or adjusted under 35 U.S.C. 154(b) by 104 days.

(21) Appl. No.: 16/165,393

(22) Filed: Oct. 19, 2018

(65) Prior Publication Data
US 2019/0122023 A1   Apr. 25, 2019

(30) Foreign Application Priority Data

Oct. 20, 2017 (TW) .............................. 106136231 A

(51) Int. Cl.
*G06K 9/00* (2006.01)
(52) U.S. Cl.
CPC ....... *G06K 9/00067* (2013.01); *G06K 9/0002* (2013.01); *G06K 9/00013* (2013.01)
(58) Field of Classification Search
CPC ............. G06K 9/00013; G06K 9/0002; G06K 9/00067
See application file for complete search history.

(56) References Cited

U.S. PATENT DOCUMENTS

| | | | |
|---|---|---|---|
| 7,840,066 B1* | 11/2010 | Chen ....................... | G06T 5/002 382/168 |
| 2002/0146156 A1* | 10/2002 | Morimura .......... | G06K 9/00013 382/124 |
| 2008/0272999 A1* | 11/2008 | Kurokawa ........... | G09G 3/3406 345/89 |
| 2011/0292022 A1* | 12/2011 | Lee ........................ | G09G 3/003 345/212 |
| 2013/0051636 A1* | 2/2013 | Hara ....................... | G06T 5/003 382/124 |
| 2014/0198298 A1* | 7/2014 | Cheng .................. | A61B 3/0025 351/206 |
| 2018/0341799 A1* | 11/2018 | Schwartz ............ | G06F 3/03547 |

* cited by examiner

*Primary Examiner* — David Bilodeau
(74) *Attorney, Agent, or Firm* — Muncy, Geissler, Olds & Lowe, P.C.

(57) ABSTRACT

A fingerprint detecting apparatus and method process a fingerprint image based on an offset value and a gain value to produce a digital image. The fingerprint detecting apparatus and method are capable of adjusting the offset value without finding out a largest pixel number of multiple grayscale values. Alternatively, the offset value and the gain value corresponding to the offset value are selected to enhance the quality of the digital image.

41 Claims, 17 Drawing Sheets

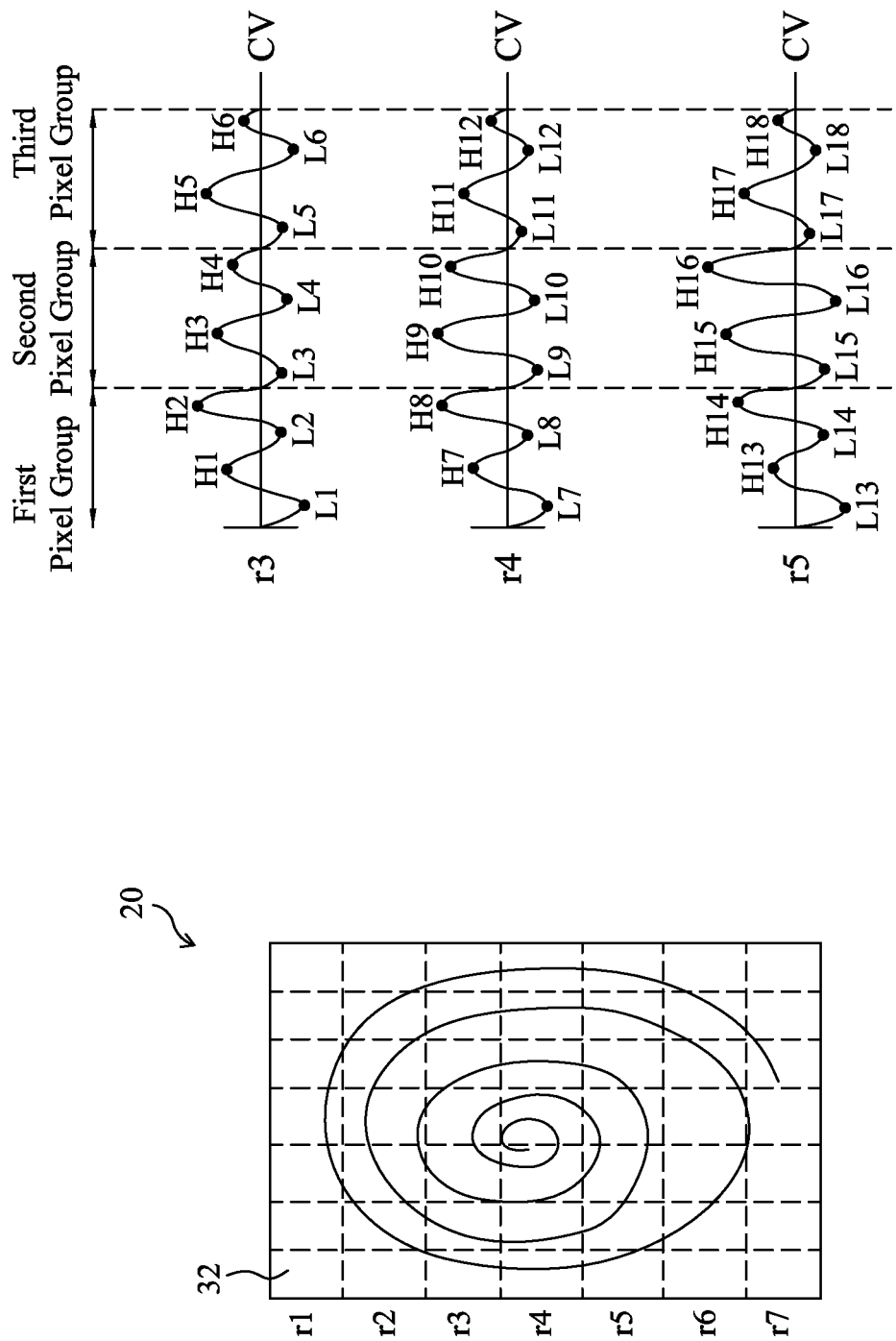

IMAGE QUALITY IN A FINGERPRINT DETECTING APPARATUS AND METHOD

CROSS-REFERENCE TO RELATED APPLICATIONS

This application claims the priority benefit of Taiwan Application No. 106136231, filed 20 Oct. 2017, the contents of which in its entirety are herein incorporated by reference.

FIELD OF THE INVENTION

The present invention is generally related to a fingerprint detecting apparatus and method and, more particularly, to an apparatus and method for improvement of image quality in fingerprint detections.

BACKGROUND OF THE INVENTION

A fingerprint is applied to certify identity widely because of its biological characteristics. In a fingerprint identification process, the detected fingerprint is typically converted into a grayscaled digital image. The more difference of grayscale between a ridge and a valley of the fingerprint is, the better quality of the digital image is, thus enhancing recognition rate of the fingerprint. To adjudge the quality of the digital image, a histogram of pixel numbers is made according to the grayscale distribution of the digital image. Assuming that the gray scales of pixels in the digital image are divided into 256 levels, designated by grayscale values of 0 to 255, an ideal grayscale distribution of the digital image is within the range of grayscale values of 3 to 250, as shown in FIG. 1 for instance. Conversely, if the gray scales of pixels in the digital image are concentrated in a certain smaller range, for example as illustrated in FIG. 2 and FIG. 3, it will be difficult to distinguish the ridge and the valley of the fingerprint, thus causing incorrect identification.

A fingerprint detecting apparatus converts the detected fingerprint image into a digital image by ways of image digitizing unit where the gain value and the offset value used will influence the quality of the digital image. The gain and the offset of a conventional fingerprint detecting apparatus are set with constant values as it is manufactured. In other words, it is impossible to adjust the gain value and the offset value on the basis of using requirements. However, the set gain value and offset value are not always applicable for in various environments (such as different temperatures or humidities), fingers (such as the finger gets wet or is dry), touching conditions (such as different areas, forces, and angles), and circuit condition (for example, the circuit is aged), thus resulting in histograms as shown in FIGS. 2 and 3.

To overcome such problems, an improved fingerprint detecting apparatus contains multiple preset gain values configured to correspond to different conditions individually, but as desiring to change the gain values, it is essential to find out the grayscale value occupied by the maximum pixel number in the histogram (i.e., peak values of a curved line of FIG. 1) after storing and comparing the entire pixel numbers of the grayscale values by using large amount of memory so as to obtain the peak values of FIG. 1, thus having high cost and long operation time. Furthermore, this improved fingerprint detecting apparatus merely includes a constant offset value which cannot be changed by users and thus, even using several preset gain values, the resultant digital image is still difficult to be distinguished for some applications.

SUMMARY OF THE INVENTION

An objective of the present invention is to provide a fingerprint detecting apparatus and method for improvement of image quality in fingerprint detections.

Another objective of the present invention is to provide a fingerprint detecting apparatus and method using adjustable offset values for converting a fingerprint image to a digital image.

A further objective of the present invention is to provide a fingerprint detecting apparatus and method controlling the gain value and the offset value in the conversion of a fingerprint image to a digital image.

According to the present invention, a fingerprint detecting apparatus includes a memory unit, an image digitizing unit, and an image histogram index unit, the image digitizing unit processes a fingerprint image so as to produce a digital image based on an offset value and a gain value provided by the memory unit, and the image histogram index unit counts multiple pixel numbers of multiple grayscale values of the digital image, wherein the multiple grayscale values have the multiple pixel numbers respectively, and the multiple pixel numbers of the multiple grayscale values are accumulated from a highest grayscale value to a lowest grayscale value or from the lowest grayscale value to the highest grayscale value so as to produce a cumulative value until the cumulative value is more than a first preset value and a pixel number of a last accumulated grayscale value is more than a second preset value, wherein the accumulated grayscale value is configured to adjust the offset value, thus enhancing a quality of the digital image.

According to the present invention, a fingerprint detecting method comprises the steps of providing an offset value and a gain value, processing a fingerprint image based on the offset value and the gain value to produce a digital image, counting multiple grayscale values of multiple grayscale of the digital image, wherein the multiple grayscale values have the multiple pixel numbers respectively, accumulating the multiple pixel numbers of the multiple grayscale values from a highest grayscale value to a lowest grayscale value or from the lowest grayscale value to the highest grayscale value so as to produce a cumulative value until the cumulative value is more than a first preset value and a pixel number of a last accumulated grayscale value is more than a second preset value, and, adjusting the offset value based on the last accumulated grayscale value, thus enhancing a quality of the digital image.

According to the present invention, a fingerprint detecting apparatus includes a memory unit, an image digitizing unit, and an image histogram index unit, the image digitizing unit processes a fingerprint image so as to produce a digital image based on an offset value and a gain value provided by the memory unit, and the image histogram index unit counts multiple pixel numbers of multiple grayscale values of the digital image, wherein the multiple grayscale values have the multiple pixel numbers respectively, the multiple grayscale values are distributed into a plurality of groups, and a sum of pixel numbers of each of the plurality of groups is calculated, wherein the pixel numbers of the plurality of groups are accumulated from a highest grayscale value to a lowest grayscale value or from the lowest grayscale value to the highest grayscale value so as to produce a cumulative value until the cumulative value is more than a preset value, wherein a specific grayscale value is selected from a last accumulated group of the plurality of groups to adjust the offset value, thus enhancing a quality of the digital image.

According to the present invention, a fingerprint detecting method comprises the steps of providing an offset value and a gain value, processing a fingerprint image based on the offset value and the gain value to produce a digital image, counting multiple pixel numbers of multiple grayscale values of the digital image, wherein the multiple grayscale values have the multiple pixel numbers respectively, distributing the multiple grayscale values into a plurality of groups, and calculating a sum of pixel numbers of each of the plurality of groups, accumulating the pixel numbers of the plurality of groups from a highest grayscale value to a lowest grayscale value or from the lowest grayscale value to the highest grayscale value so as to produce a cumulative value until the cumulative value is more than a preset value, wherein a specific grayscale value is selected from a last accumulated group of the plurality of groups, and adjusting the offset value based on the specific grayscale value, thus enhancing a quality of the digital image.

According to the present invention, a fingerprint detecting apparatus includes a memory unit, an image digitizing unit, and an image histogram index unit, the memory unit stores multiple parameter groups and sends one of the multiple parameter groups based on a selection signal, wherein each of the multiple parameter groups has a gain value and an offset value, the image digitizing unit processes a fingerprint image so as to produce a digital image based on the one parameter group sent from the memory unit, and the image histogram index unit counts multiple pixel numbers of multiple grayscale values of the digital image, wherein the multiple grayscale values have the multiple pixel numbers respectively, and the multiple pixel numbers of the multiple grayscale values are accumulated from a highest grayscale value to a lowest grayscale value or from the lowest grayscale value to the highest grayscale value so as to produce a cumulative value until the cumulative value is more than a first preset value and a pixel number of a last accumulated grayscale value is more than a second preset value, wherein the accumulated grayscale value is configured to control the selection signal and to control the memory unit to send the one parameter group, thus enhancing a quality of the digital image.

According to the present invention, a fingerprint detecting method comprises the steps of selecting one of multiple parameter groups, wherein each of the multiple parameter groups has a gain value and an offset value, processing a fingerprint image based on the one parameter group to produce a digital image, counting multiple pixel numbers of multiple grayscale values of the digital image, wherein the multiple grayscale values have the multiple pixel numbers respectively, accumulating the multiple pixel numbers of the multiple grayscale values from a highest grayscale value to a lowest grayscale value or from the lowest grayscale value to the highest grayscale value so as to produce a cumulative value until the cumulative value is more than a first preset value and a pixel number of a last accumulated grayscale value is more than a second preset value, and determining whether the last accumulated grayscale value meets with a target value, wherein when the last accumulated grayscale value does not meet the target value, another parameter group of the multiple parameter groups is selected to produce the digital image, thus enhancing a quality of the digital image.

According to the present invention, a fingerprint detecting apparatus includes a memory unit, an image digitizing unit, and an image histogram index unit, the memory unit stores multiple parameter groups and sends one of the multiple parameter groups based on a selection signal, wherein each of the multiple parameter groups has a gain value and an offset value, the image digitizing unit processes a fingerprint image so as to produce a digital image based on the one parameter group sent from the memory unit, and the image histogram index unit counts multiple pixel numbers of multiple grayscale values of the digital image, wherein the multiple grayscale values have the multiple pixel numbers respectively, the multiple grayscale values are distributed into a plurality of groups, and a sum of pixel numbers of each of the plurality of groups is calculated, wherein the pixel numbers of the plurality of groups are accumulated from a highest grayscale value to a lowest grayscale value or from the lowest grayscale value to the highest grayscale value so as to produce a cumulative value until the cumulative value is more than a preset value, wherein a specific grayscale value is selected from a last accumulated group of the plurality of groups to control the selection signal and to control the memory unit to send the one parameter group, thus enhancing a quality of the digital image.

According to the present invention, a fingerprint detecting method comprises the steps of selecting one of multiple parameter groups, wherein each of the multiple parameter groups has a gain value and an offset value, processing a fingerprint image based on the one parameter group to produce a digital image, counting multiple pixel numbers of multiple grayscale values of the digital image, wherein the multiple grayscale values have the multiple pixel numbers respectively, distributing the multiple grayscale values into a plurality of groups, and calculating a sum of pixel numbers of each of the plurality of groups, accumulating the pixel numbers of the plurality of groups from a highest grayscale value to a lowest grayscale value or from the lowest grayscale value to the highest grayscale value so as to produce a cumulative value until the cumulative value is more than a preset value, wherein a specific grayscale value is selected from a last accumulated group of the plurality of groups, and determining whether the specific grayscale value meets a target value, wherein when the specific grayscale value does not meet a target value, another of the multiple parameter groups is selected to produce the digital image, thus enhancing a quality of the digital image.

According to the present invention, a fingerprint detecting apparatus includes a memory unit, an image digitizing unit, and an image histogram index unit, the image digitizing unit processes a fingerprint image so as to produce a digital image based on an offset value and a gain value provided by the memory unit, and the image histogram index unit reads multiple grayscale values of at least one pixel row of the digital image, wherein the at least one pixel row is allocated into at least one pixel group, and a largest grayscale value of each of the at least one pixel group more than a comparison value is found out, and largest grayscale values of the at least one pixel group are averaged to produce an average value configured to adjust the offset value, thus enhancing a quality of the digital image.

According to the present invention, a fingerprint detecting method comprises the steps of providing an offset value and a gain value, processing a fingerprint image based on the offset value and the gain value to produce a digital image, reading multiple grayscale values of at least one pixel row of the digital image, allocating the at least one pixel row into at least one pixel group, and finding out a largest grayscale value of each of the at least one pixel group more than a comparison value, averaging largest grayscale values of the at least one pixel group, and enhancing a quality of the digital image after averaging the largest grayscale values of the at least one pixel group According to the present invention, a fingerprint detecting apparatus includes a memory unit, an image digitizing unit, and an image histogram index unit, the memory unit stores multiple parameter groups and sends one of the multiple parameter groups based on a selection signal, wherein each of the multiple parameter groups has a gain value and an offset value, the image digitizing unit processes a fingerprint image so as to produce a digital image based on the one parameter group sent from the memory unit, and the image histogram index unit reads multiple grayscale values of at least one pixel row of the digital image, wherein the at least one pixel row is allocated into at least one pixel group, and a smallest grayscale value of each of the at least one pixel group less than a comparison value is found out, and smallest grayscale values of the at least one pixel group are averaged to control the selection signal and to control the memory unit to send the one parameter group, thus enhancing a quality of the digital image.

According to the present invention, a fingerprint detecting method comprises the steps of selecting one of multiple parameter groups, wherein each of the multiple parameter groups has a gain value and an offset value, processing a fingerprint image based on the one parameter group to produce a digital image, reading multiple grayscale values of at least one pixel row of the digital image, allocating the at least one pixel row into at least one pixel group, and finding out a smallest grayscale value of each of the at least one pixel group less than a comparison value, averaging smallest grayscale values of the at least one pixel group, and determining whether the average value meets a target value, wherein when the average value does not meet the target value, another of the multiple parameter groups is selected to produce the digital image, thus enhancing a quality of the digital image.

BRIEF DESCRIPTION OF THE DRAWINGS

FIG. 15 is a schematic view of a digital image of the present invention;

FIG. 16 is a schematic view showing multiple grayscale values of the multiple pixels of some of the multiple pixel rows r3, r4, r5 according to the second embodiment of the present invention;

DETAILED DESCRIPTION OF PREFERRED EMBODIMENTS

Figure 4:
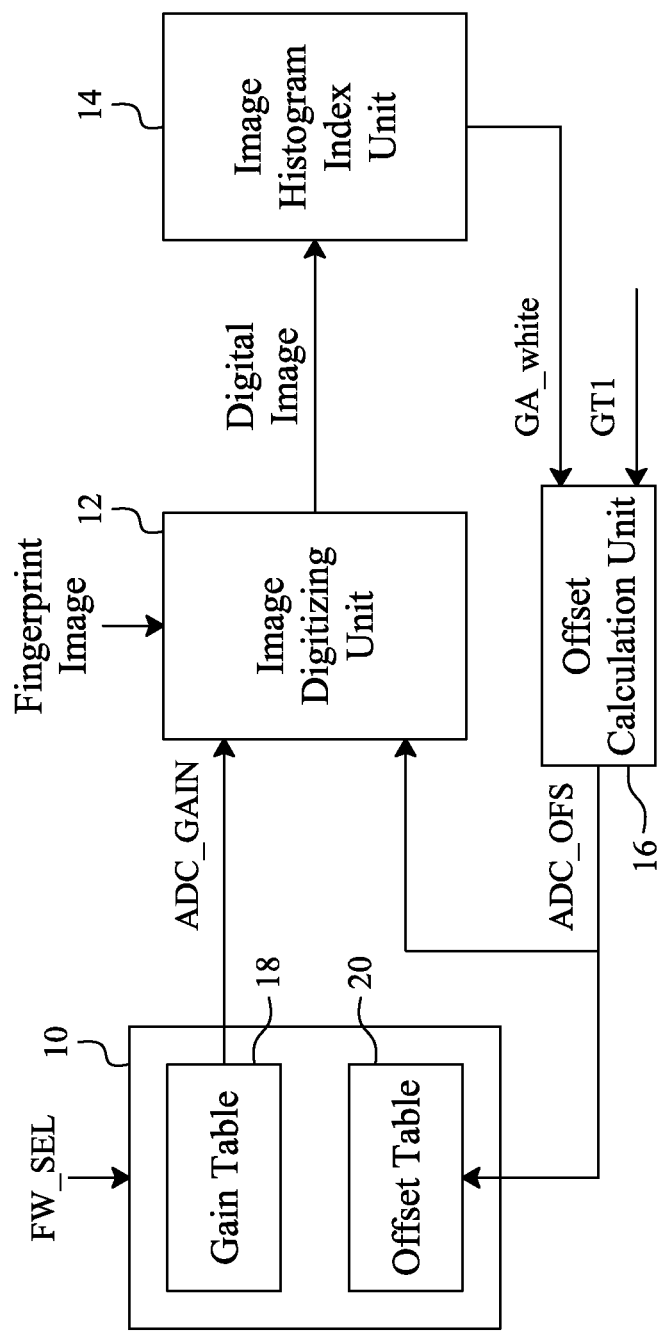
FIG. 4 is a schematic view showing the assembly of a fingerprint detecting apparatus according to a first embodiment of the present invention.

With reference to FIG. 4, a fingerprint detecting apparatus according to a first embodiment of the present invention comprises: a memory unit 10, an image digitizing unit 12, an image histogram index unit 14, and an offset calculation unit 16.

The memory unit 10 includes a gain table 18 and an offset table 20, wherein at least one gain value is stored in the gain table 18.

Figure 5:
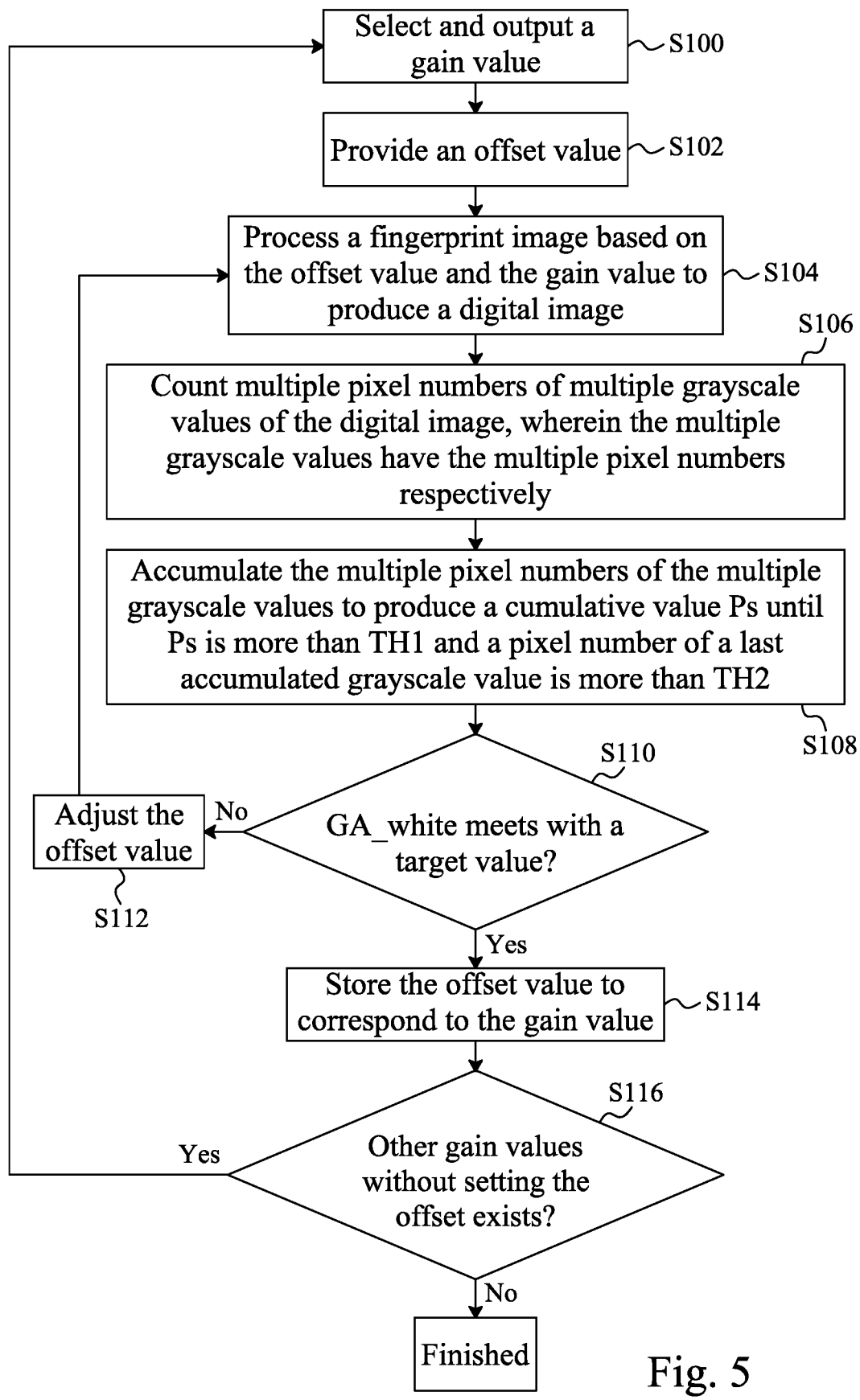
FIG. 5 is a flow chart showing a first operating process of the fingerprint detecting apparatus of FIG. 4 according to the first embodiment of the present invention.

FIG. 5 is a flow chart showing a first operating process of the fingerprint detecting apparatus, the first operating process includes a step S100 in which the memory unit 10 selects and outputs a first gain value ADC_GAIN from the gain table 18 based on a selected signal FW_SEL; a step S102 in which an offset ADC_OFS is provided by the offset calculation unit 16, wherein an initial value of the offset ADC_OFS is set to zero. The fingerprint detecting apparatus further comprises a sensing unit (not shown) configured to scan a fingerprint of a finger so as to produce an analog image of the finger, and the image digitizing unit 12 processes the analog image of the finger according to the offset ADC_OFS and the first gain value ADC_GAIN, thus producing a digital image in a step S104.

Figure 6:
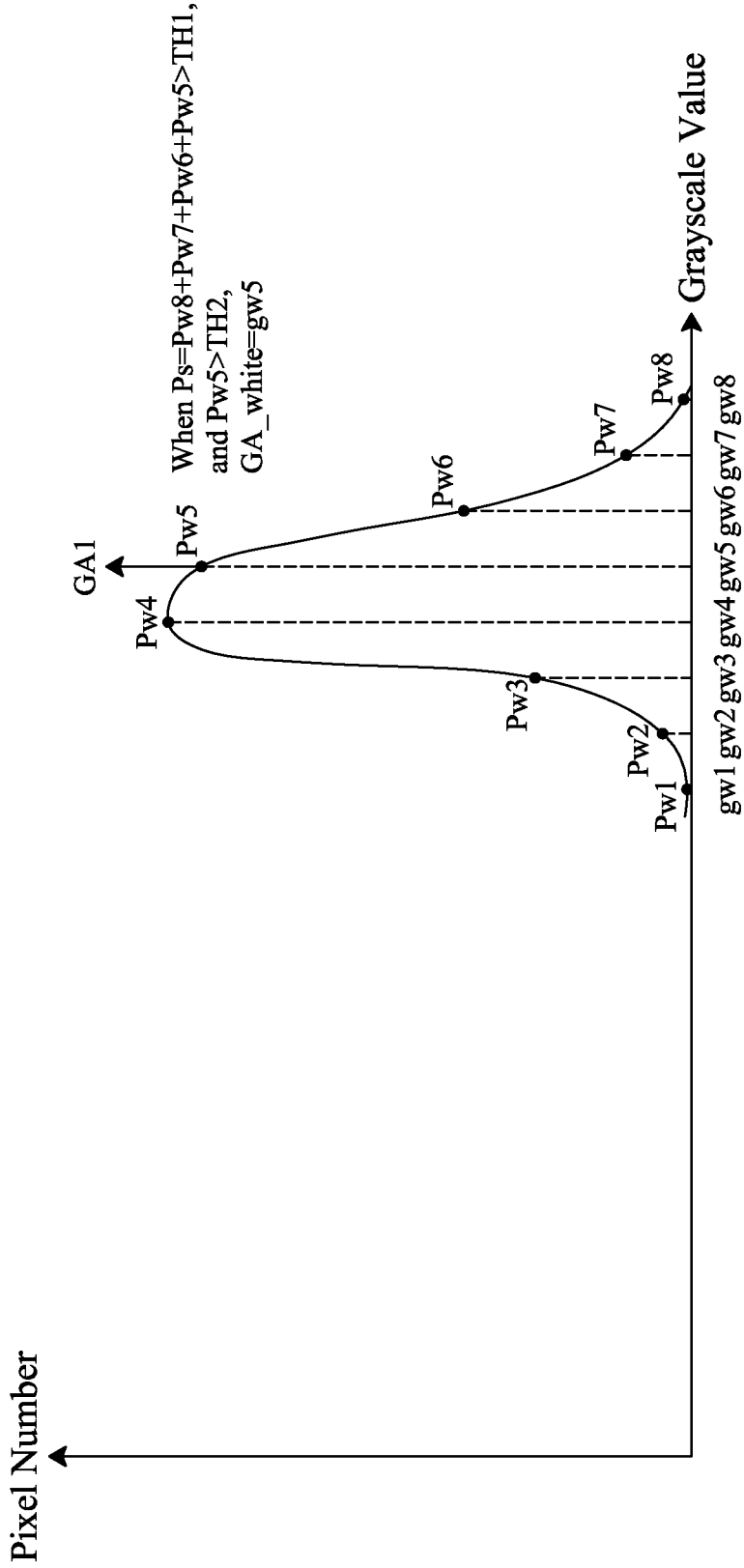
FIG. 6 is a histogram showing multiple pixel numbers without the finger so as to illustrate a step S106 and a step S108 of FIG. 5 according to the first embodiment of the present invention.

FIG. 6 is a histogram showing multiple pixel numbers without the finger so as to illustrate a step S106 and a step S108 of FIG. 5. After the image histogram index unit 14 acquires the digital image, multiple pixel numbers of multiple grayscale values of the digital image are counted in the step S106, wherein the multiple grayscale values have the multiple pixel numbers respectively, and the multiple pixel numbers of the multiple grayscale values are counted within a predetermined range. For example, the multiple pixel numbers Pw1 to Pw8 of the multiple grayscale values gw1 to gw8 are counted as shown in FIG. 6. After obtaining the multiple pixel numbers of the multiple grayscale values, a cumulative value Ps is calculated by accumulating the multiple grayscale values from a lowest gw1 grayscale value gw1 to a highest grayscale value gw8 in the step S108. With reference to FIG. 6, the cumulative value Ps is calculated by accumulating the multiple grayscale values from the highest grayscale value gw8 to the lowest grayscale value gw1, wherein when the cumulative value Ps=Pw8+Pw7+Pw6+Pw5 is more than a first preset value TH1 and a pixel number Pw5 of a last accumulated grayscale value gw5 is more than a second preset value TH2, the image histogram index unit 14 outputs the last accumulated grayscale value GA_white=gw5. When the cumulative value Ps=Pw8+Pw7+Pw6+Pw5 is more than the first preset value TH1 but the cumulative value Ps is less than the second preset value TH2, some pixel numbers Pw8 to Pw4 are accumulated to acquire the cumulative value Ps. Thereafter, a pixel number Pw4 of a last accumulated grayscale value gw4 is judged whether it is more than the second preset value TH2, wherein when the pixel number Pw4 is more than the second preset value TH2, the image histogram index unit 14 outputs the last accumulated grayscale value GA_white=gw4. In another embodiment, the multiple grayscale values are accumulated from gw1 to gw8, for example, when Ps=Pw1+Pw2+Pw3+Pw4 is more than the first preset value TH1 and the pixel number Pw4 of the last accumulated grayscale value gw4 is more than the second preset value TH2, the image histogram index unit 14 outputs the last accumulated grayscale value GA_white=gw4.

Referring to FIGS. 5-6, after obtaining the last accumulated grayscale value GA_white=gw5 in the step S108, a step S110 is executed. For instance, the offset calculation unit 16 determines whether the last accumulated grayscale value GA_white meets a target value GT1, wherein when the last accumulated grayscale value GA_white does not meet the target value GT1, the offset calculation unit 16 adjusts the offset ADC_OFS in a step S112. For example, the offset calculation unit 16 reduces or increases the offset ADC_OFS by one unit, when the last accumulated grayscale value GA_white is more than or less than the target value GT. Alternatively, the offset calculation unit 16 adjusts the offset ADC_OFS based on a deviation between the last accumulated grayscale value GA_white and the target value GT1, wherein the step S104 to the step S110 is executed repeatedly after adjusting the offset ADC_OFS. When the last accumulated grayscale value GA_white meets the target value GT1, a step S114 is executed. For instance, the offset calculation unit 16 stores the offset ADC_OFS to the offset table 20 so as to correspond to the first gain value ADC_GAIN. A step S116 is executed after storing the offset ADC_OFS so as to judge whether the other gain values are not set to correspond to the offset, wherein when the other gain values are not set to correspond to the offset, the step S110 is executed repeatedly. For example, the other gain values are selected and set. When the other gain values are set to correspond to the offset value, the step S110 is finished.

Figure 7:
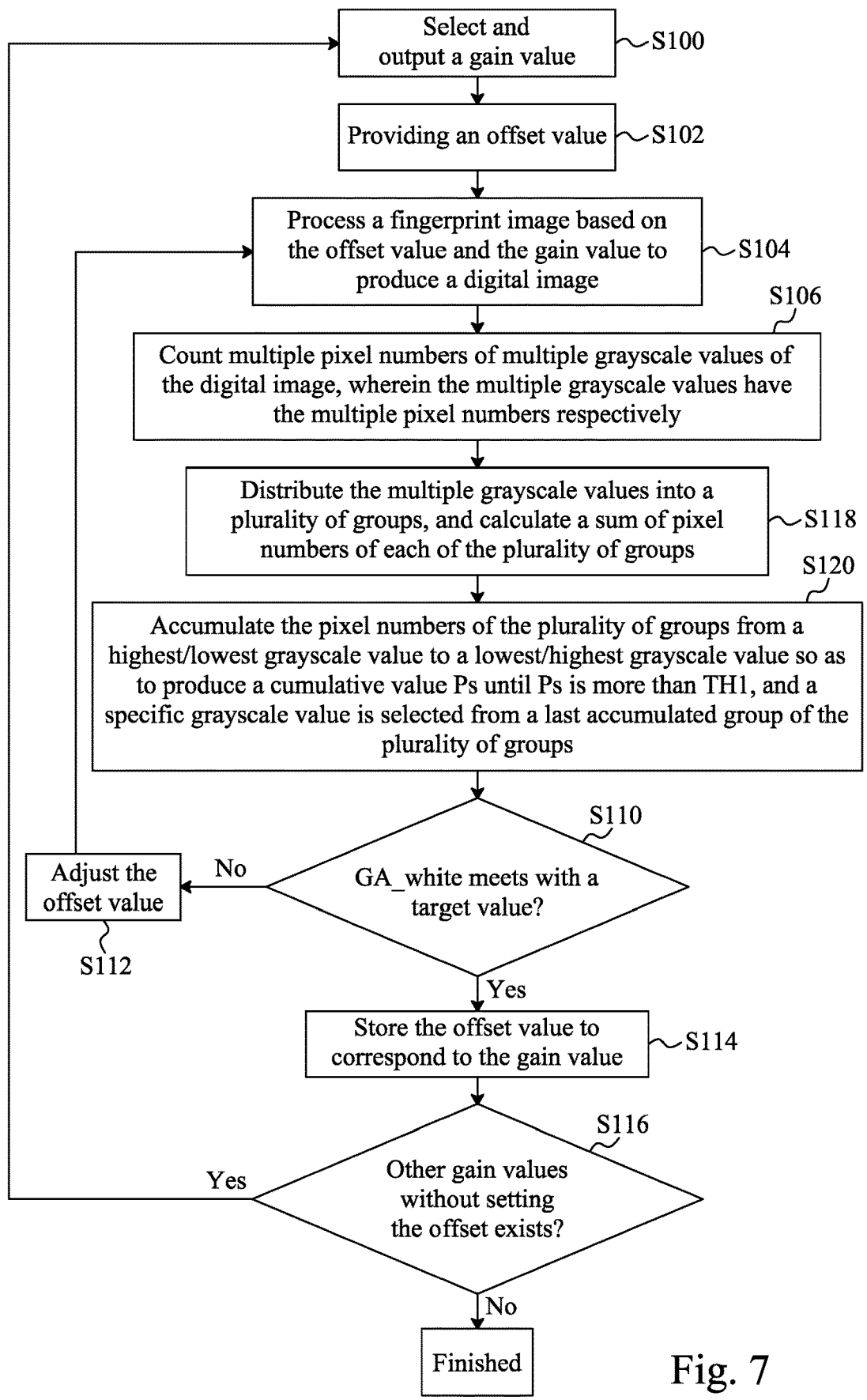
FIG. 7 is a flow chart showing a second operating process of the fingerprint detecting apparatus of FIG. 4 according to the first embodiment of the present invention.

FIG. 7 is a flow chart showing a second operating process of the fingerprint detecting apparatus, wherein the step S100, the step S102, the step S104, the step S106, the step S110, the step S112, the step S114, and the step S116 are executed in the second operating process.

Figure 8:
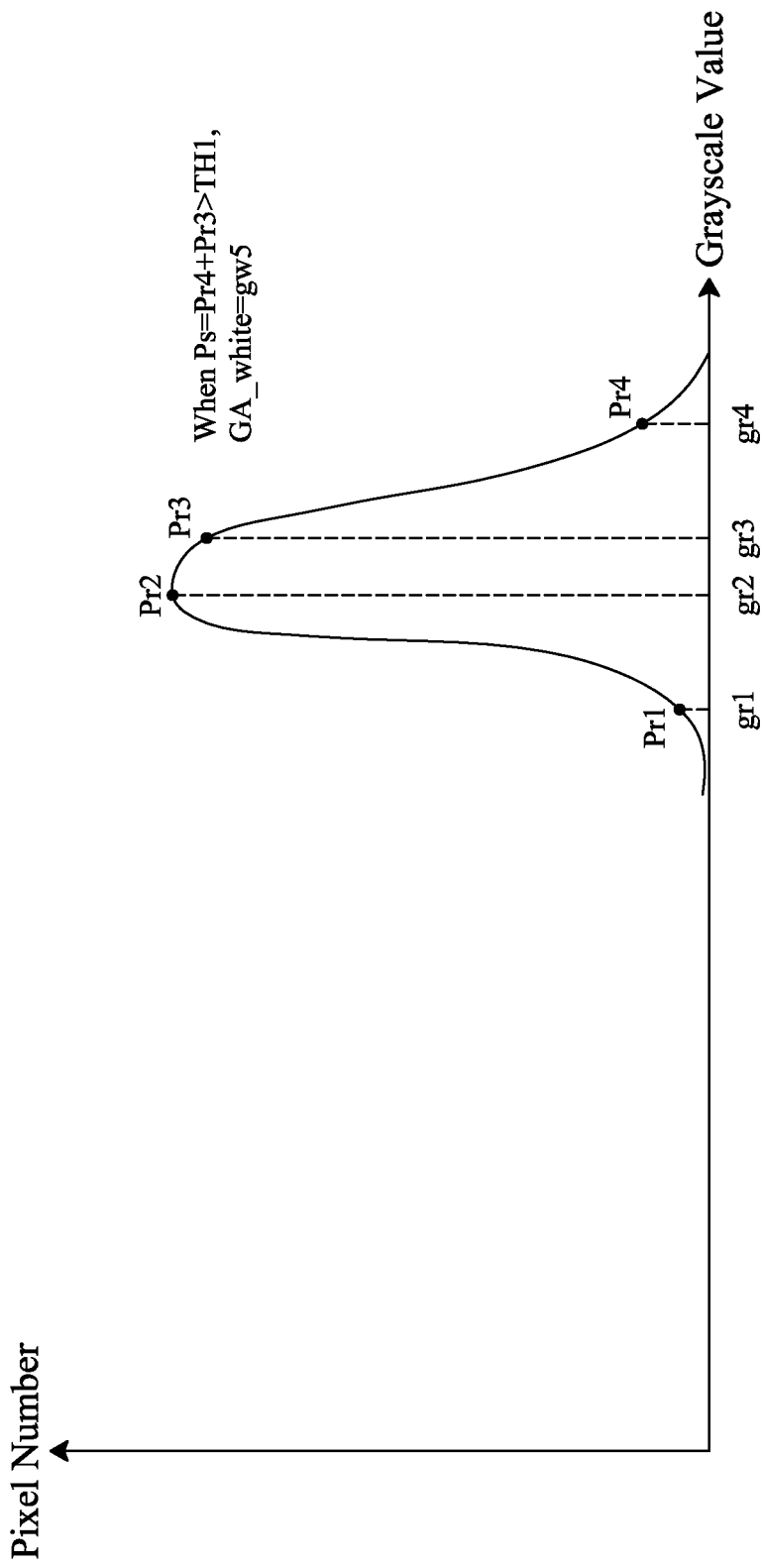
FIG. 8 is a histogram showing the multiple pixel numbers without the finger so as to illustrate a step S118 and a step S120 of FIG. 7 according to the first embodiment of the present invention.

FIG. 8 is a histogram showing the multiple pixel numbers without the finger so as to illustrate a step S118 and a step S120 of FIG. 7. It is to be noted that the step S118 is executed after the step S106 as shown in FIG., and the image histogram index unit 14 distributes the multiple grayscale values into a plurality of groups and calculates a sum of pixel numbers of each group. For instance, a first grayscale value gw1 and a second grayscale gw2 are distributed into a first group gr1 which has a first pixel number Pr1=Pw1+Pw2. A third grayscale value gw3 and a fourth grayscale gw4 are distributed into a second group gr2 which has a second pixel number Pr2=Pw3+Pw4. A fifth grayscale value gw5 and a sixth grayscale gw6 are distributed into a third group gr3 which has a third pixel number Pr3=Pw5+Pw6. A seventh grayscale value gw7 and an eighth grayscale gw8 are distributed into a fourth group gr4 which has a fourth pixel number Pr4=Pw7+Pw8. Thereafter, in the step S120, the image histogram index unit 14 accumulates the first, second, third, and fourth pixel numbers from a highest grayscale value to a lowest grayscale value of the first, second, third, and fourth groups to acquire a grand total Ps, wherein when the grand total Ps is more than TH1, a specific grayscale value is selected from a last accumulated group of the first, second, third, and fourth groups to be the last accumulated grayscale value GA_white. For example, the image histogram index unit 14 accumulates the first, second, third, and fourth pixel numbers from the highest grayscale value of the fourth group gr4, when the grand total Ps=Pr4+Pr3>TH1, one (such as gw5) of the fifth grayscale value gw5 and the sixth grayscale gw6 of the last accumulated group gr3 is selected to be the last accumulated grayscale value GA_white. Referring further to FIG. 5, the step S110 is executed after the step S120 of FIG. 7.

With reference to FIGS. 5 and 7, the first and second operating processes are executed after the fingerprint detecting apparatus is started or based on using requirements, wherein the multiple grayscale values are adjusted according to a background color (such as a white color) so as to present a preferred contrast of a ridge and a valley of the fingerprint, thus enhancing the digital image and recognition rate of the fingerprint.

Figure 1:
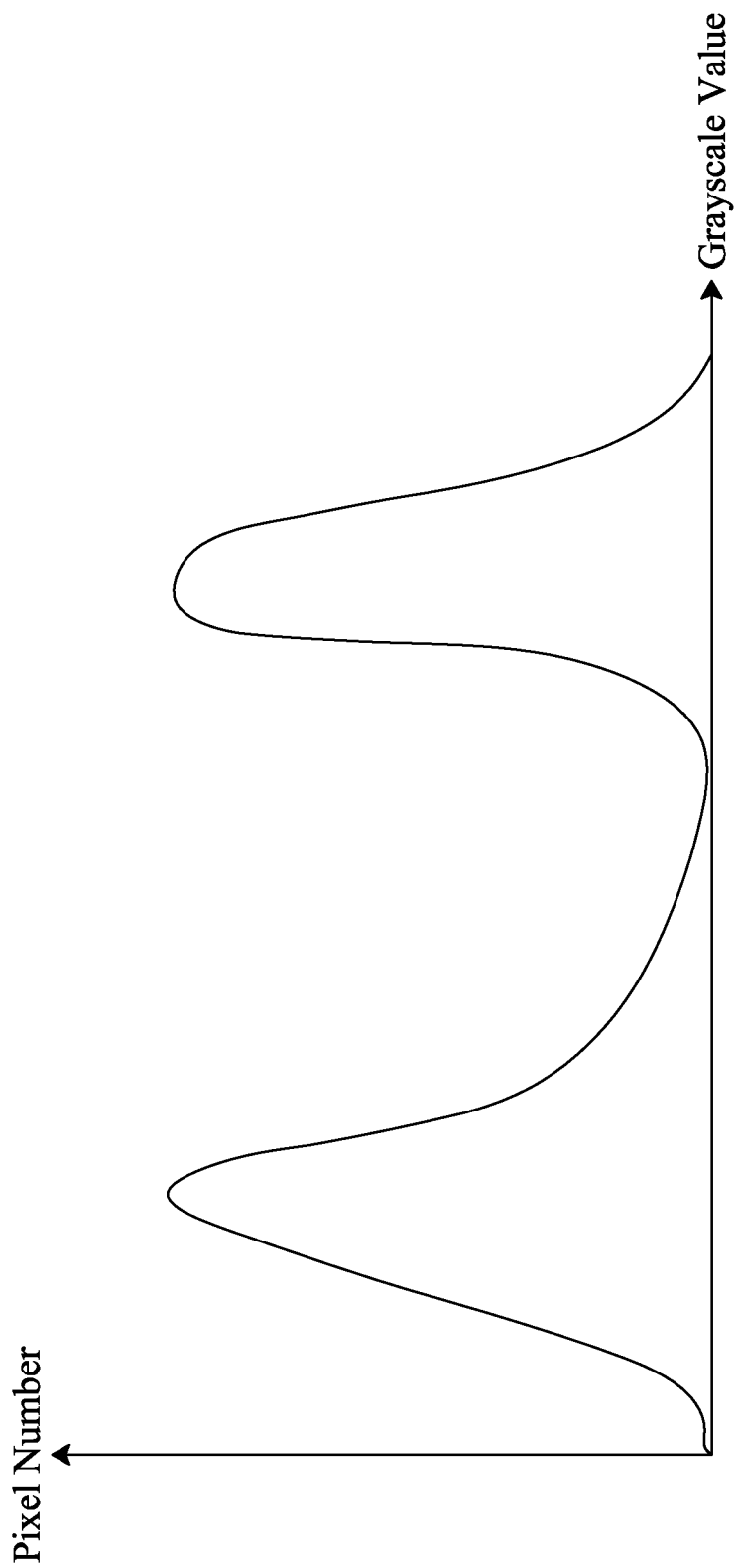
FIG. 1 is a histogram of multiple preferred pixel numbers.
Figure 2:
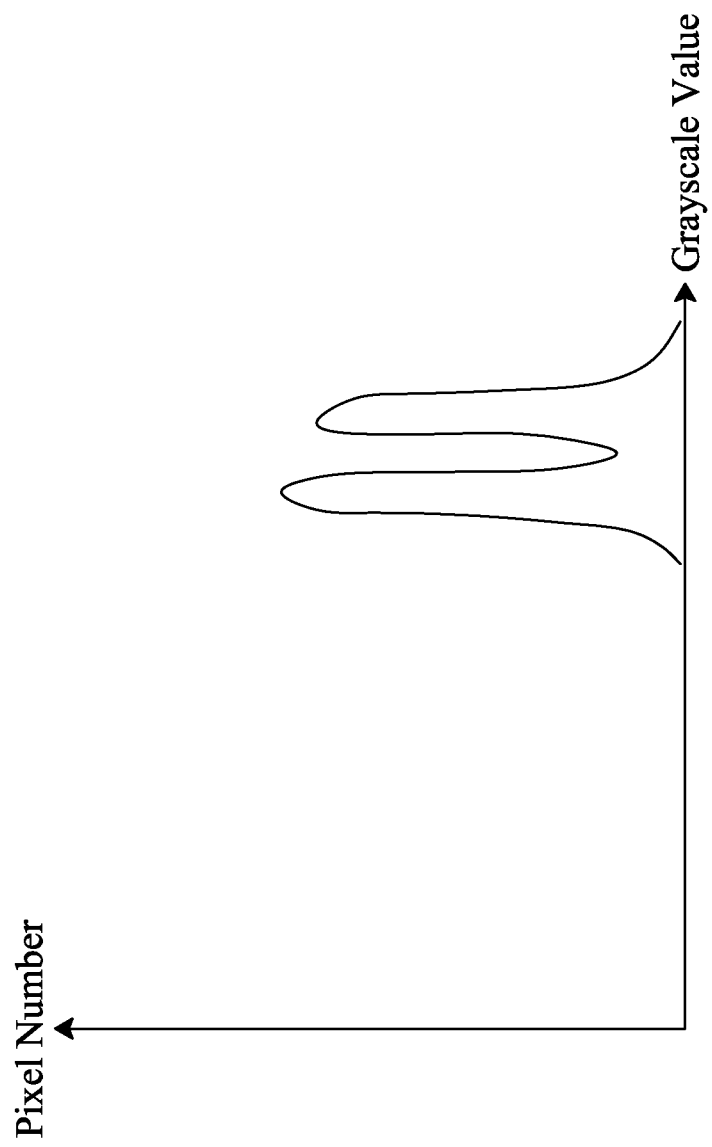
FIG. 2 is a histogram of multiple poor pixel numbers.
Figure 3:
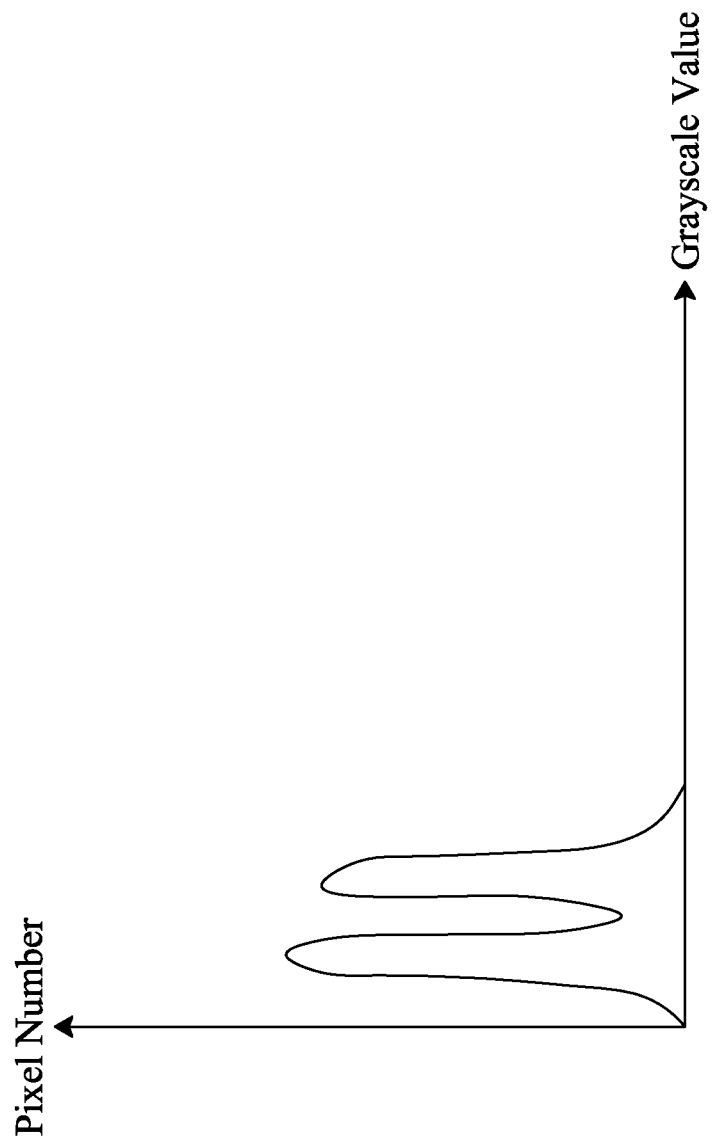
FIG. 3 is another histogram of multiple poor pixel numbers.

Thereby, the multiple pixel number of the multiple grayscale values are not stored and compared so as to find out a peak value, thus reducing consumption of the memory unit and enhancing operating speed of the fingerprint detecting apparatus. Preferably, one of the multiple grayscale values (i.e., the first grayscale value gw1 to the eighth grayscale value gw8 of the white color) is selected to set the offset ADC_OFS as shown in FIGS. 6 and 8, and such a selecting manner is applicable for a histogram as shown in FIG. 1.

Figure 9:
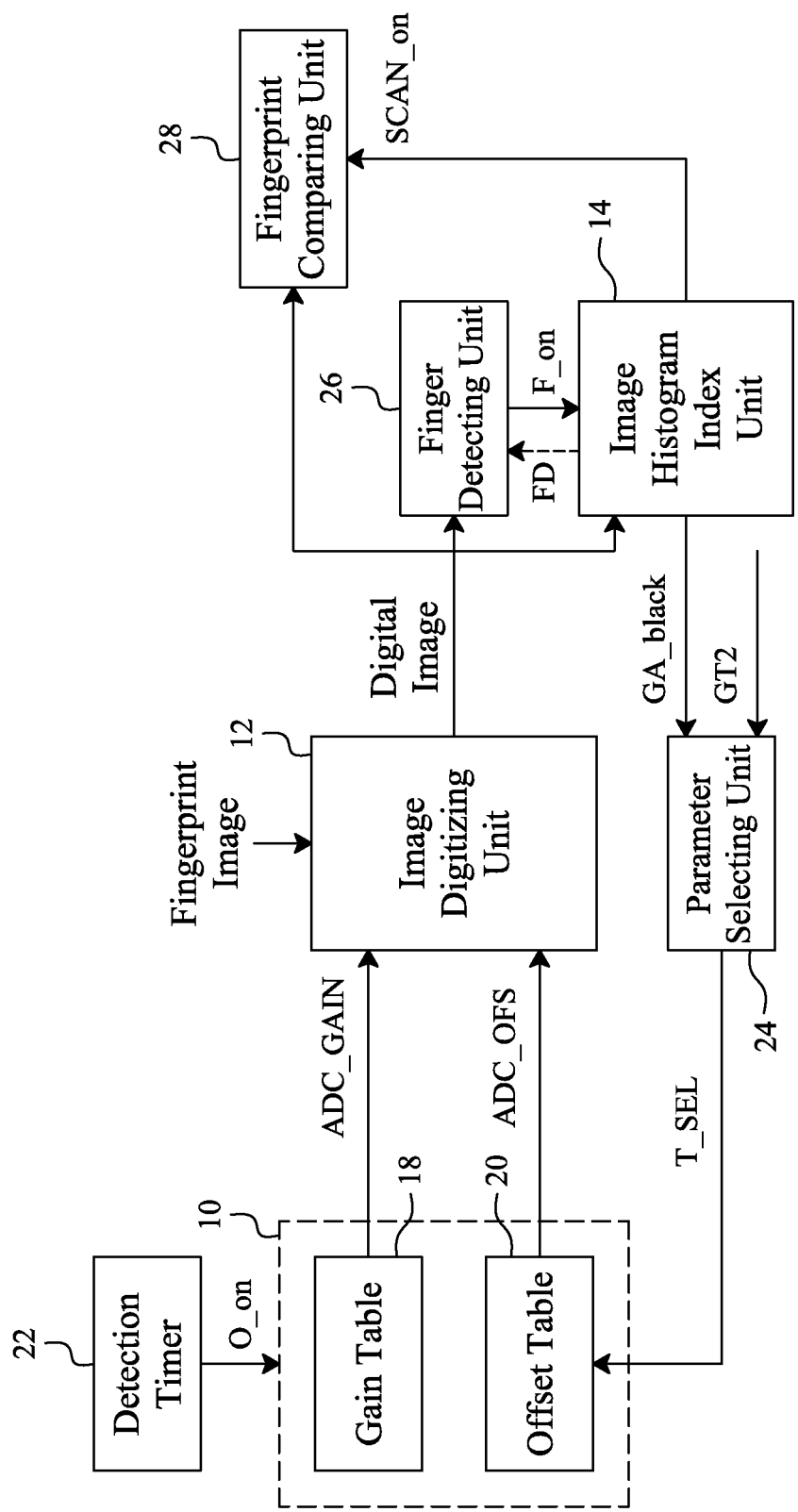
FIG. 9 is a schematic showing the assembly of a fingerprint detecting apparatus according to a second embodiment of the present invention.

With reference to FIG. 9, a fingerprint detecting apparatus according to a second embodiment of the present invention comprises: a memory unit 10, an image digitizing unit 12, and an image histogram index unit 14.

Referring to FIG. 7, the fingerprint detecting apparatus of the second embodiment further comprises: a detection timer 22, a parameter selecting unit 24, a finger detecting unit 26, and a fingerprint comparing unit 28.

The memory unit 10 includes a gain table 18 and an offset table 20, wherein multiple gain values are stored in the gain table 18, and multiple offset values are stored in the offset table 20, wherein each of the multiple offset values and each of the multiple gain values form a parameter group, and the multiple offset values of the offset table 20 are preset or are produced as shown in FIGS. 4-5.

The detection timer 22 judges whether an object touches the sensing unit (not shown) of the fingerprint detecting apparatus within a period of time. When the object touches the sensing unit, the detection timer 22 sends a touching signal O_on to the memory unit 10 so that the parameter group is outputted from the memory unit 10, wherein the parameter group has parameters of the multiple gain values ADC_GAIN and the offset ADC_OFS. The finger detecting unit 26 is configured to detect whether the object is the finger, and the fingerprint comparing unit 28 is configured to acquire features of the fingerprint from the digital image so as to have comparison and to determine whether a user's identity is correct.

Figure 10:
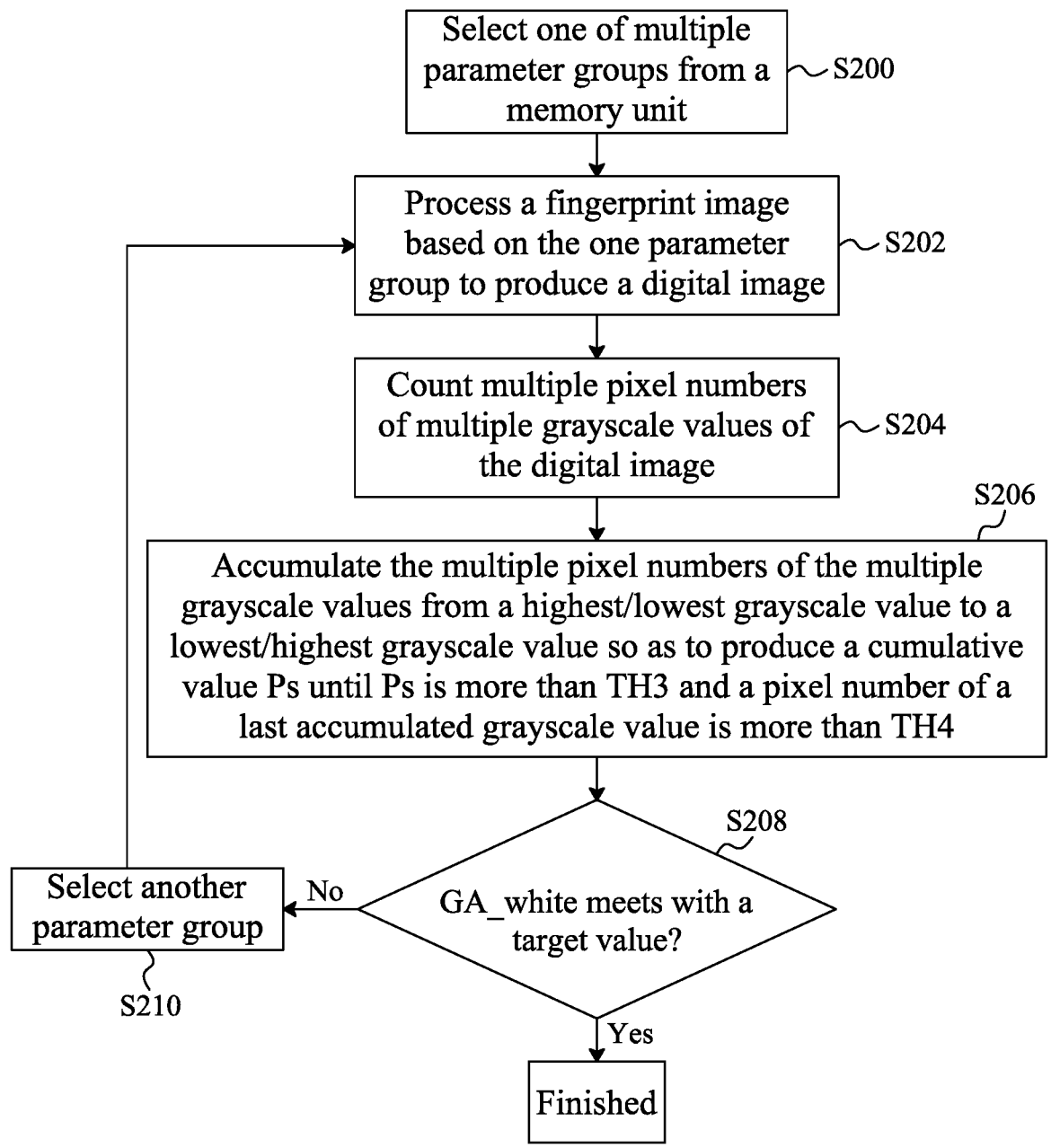
FIG. 10 is a flow chart showing a first operating process of the fingerprint detecting apparatus of FIG. 9 according to the second embodiment of the present invention.
Figure 11:
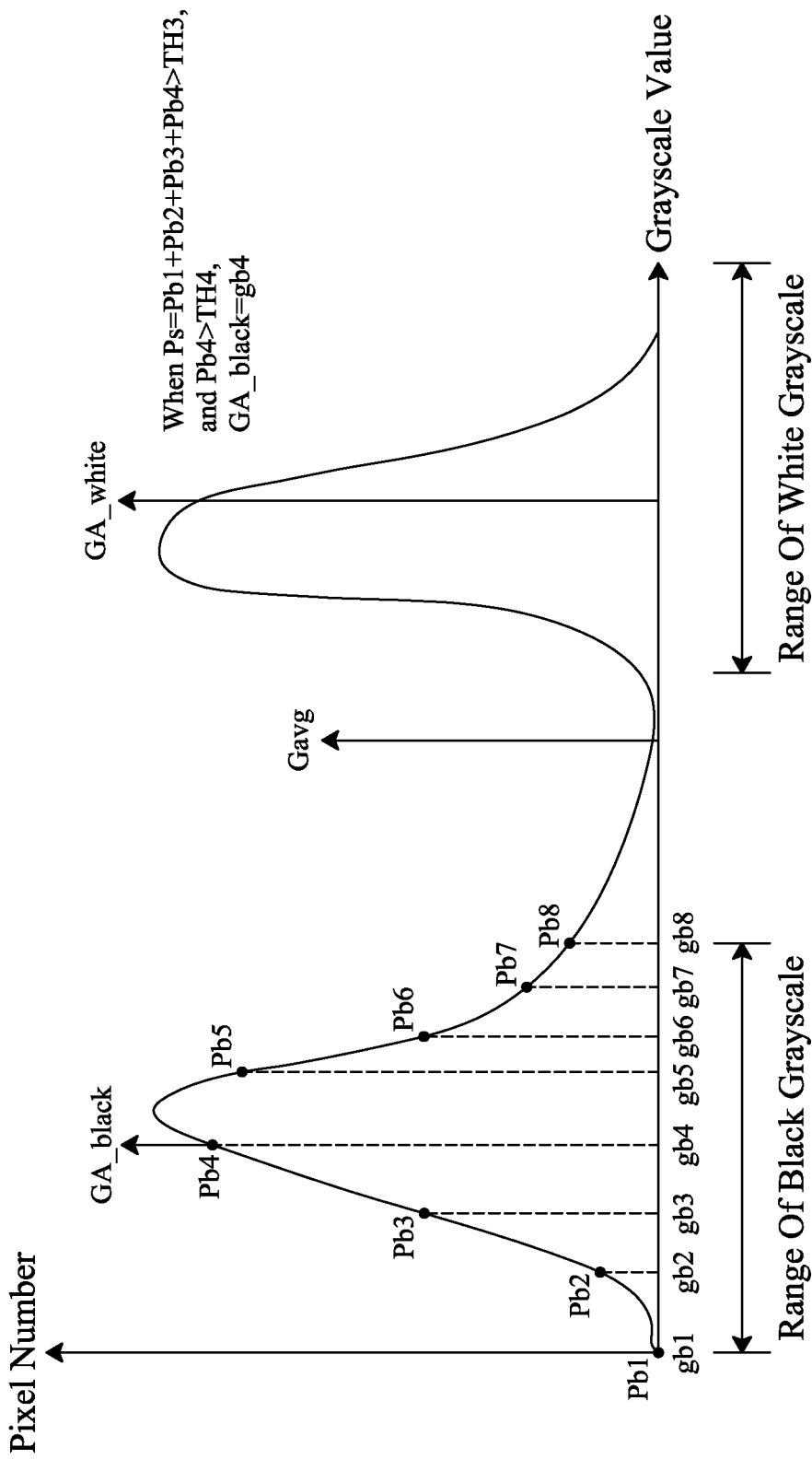
FIG. 11 is a histogram showing multiple pixel numbers with the finger so as to illustrate a step S204 and a step S206 of FIG. 10 according to the second embodiment of the present invention.

FIG. 10 is a flow chart showing a first operating process of the fingerprint detecting apparatus. FIG. 11 is a histogram showing multiple pixel numbers with the finger so as to illustrate a step S204 and a step S206 of FIG. 10. Referring to FIGS. 9-10, in a step S200, the memory unit 10 sends the parameter group based on a selection signal T_SEL outputted by the parameter selecting unit 24, after judging whether the object is sensed by the sensing unit, wherein the parameter group has the parameters of the multiple gain values ADC_GAIN and the offset ADC_OFS. Thereafter, in a step S202, the image digitizing unit 12 processes a fingerprint image from the sensing unit according to the parameter group outputted from the memory unit 10 so as to produce the digital image. After the image histogram index unit 14 receives the digital image, multiple pixel numbers Pb1 to Pb8 of the multiple grayscale values gb1 to gb 8 of the digital image are counted in the step S204, wherein the multiple grayscale values gb 1 to gb 8 have the multiple pixel numbers Pb1 to Pb8 respectively, as illustrated in FIG. 11. After acquiring the pixel numbers of the multiple grayscale values, the multiple pixel numbers Pb1 to Pb8 are accumulated from the multiple grayscale values gb1 to gb8 to produce a grand total Ps in the step S206, wherein the multiple grayscale values are accumulated from a lowest grayscale value gb 1 to a highest grayscale value gb8 of the multiple grayscale values, when the grand total Ps=Pb1+Pb2+Pb3+Pb4 is more than a first preset value TH3, and a last accumulated grayscale value gb4 is more than a second preset value TH4, the image histogram index unit 14 outputs the last accumulated grayscale value GA_black=gb4. In another embodiment, the multiple grayscale values are accumulated from a highest grayscale value gb8 to a lowest grayscale value gb1. In a step S208, the parameter selecting unit 24 determines whether the last accumulated grayscale value GA_black=gb4 meets a target value GT2, wherein when the last accumulated grayscale value GA_black does not meet the target value GT2, the parameter selecting unit 24 adjusts the selection signal T_SEL so that the memory unit 10 sends another parameter group in a step S210, and the step S202 to the step S208 is executed repeatedly. When the last accumulated grayscale value GA_black meets the target value GT2, the step S208 is finished.

With reference to FIG. 10, the multiple gain values ADC_GAIN and the offset ADC_OFS are adjusted according to the multiple grayscale values of the fingerprint (such as a black color) so as to present the preferred contrast of the ridge and the valley of the fingerprint, thus enhancing the digital image and the recognition rate of the fingerprint. Thereby, the multiple pixel numbers of the multiple grayscale values are not stored and are compared to find out the peak value, thus reducing the consumption of the memory unit and enhancing an operating speed of the fingerprint detecting apparatus.

With reference to FIG. 9, the finger detecting unit 26 detects whether the object touching the sensing unit is the finger based on the digital image, wherein when the object is the finger, a confirmation signal F_on is sent to the image histogram index unit 14. After confirming the object is the finger and adjusting the multiple gain values and the offset value, the image histogram index unit 14 transmits a comparing signal SCAN_on to the fingerprint comparing unit 28, such that the fingerprint is compared by the fingerprint comparing unit 28. In one embodiment, the step S204 and the step S206 are not executed after the step S200 and the step S202 until the finger detecting unit 26 detects the object is the finger. In another embodiment, after adjusting the multiple gain values and the offset value as shown in FIG. 8, the finger detecting unit 26 detects whether the object touching the sensing unit is the finger based on the digital image. The image histogram index unit 14 transmits calculated data FD to the finger detecting unit 26 so that the finger detecting unit 26 judges whether the digital image is abnormal, wherein the calculated data FD contains analysis result of the multiple grayscale values of the white color, the multiple grayscale values of the black color, and average values of the multiple grayscale values of the white and black colors as shown in FIG. 11. The analysis result of the multiple grayscale values of the white color is GA_white as shown in FIG. 6, and analysis result of the multiple grayscale values of the black color is GA_black as illustrated in FIG. 11.

As shown in FIG. 10, in one embodiment, the image histogram index unit 14 judges a quality of the digital image adjusts and produces preferred multiple gain values ADC_GAIN and a preferred offset ADC_OFS.

When the quality of the digital image does not meet the using requirement, the image histogram index unit 14 identifies that detecting the fingerprint is failed. When the quality of the digital image meets the using requirements, the finger detecting unit 26 sends the confirmation signal F_on to compare the fingerprint.

Figure 12:
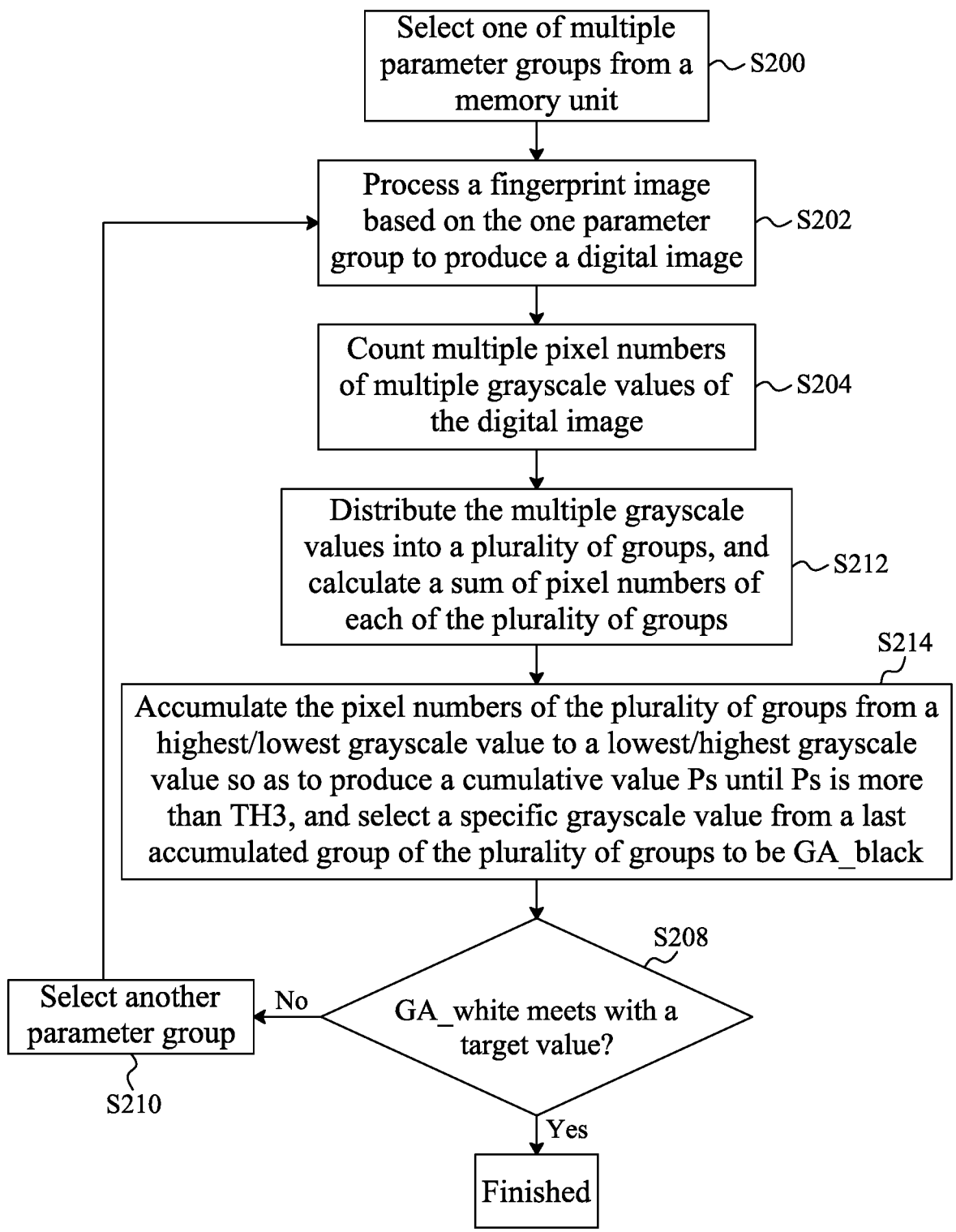
FIG. 12 is a flow chart showing a second operating process of the fingerprint detecting apparatus of FIG. 9 according to the second embodiment of the present invention.
Figure 13:
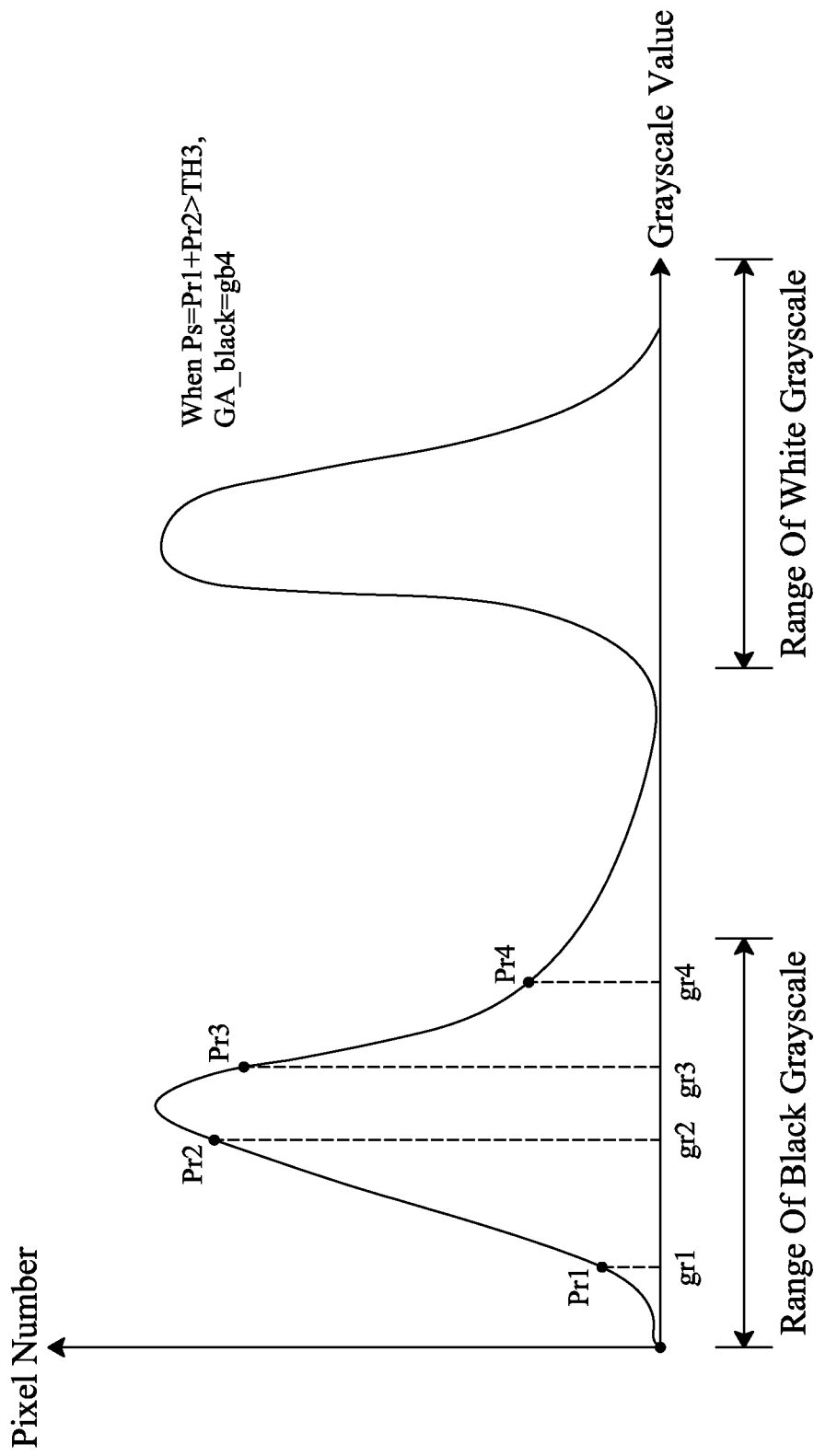
FIG. 13 is a histogram showing multiple pixel numbers with the finger so as to illustrate a step S212 and a step S214 of FIG. 12 according to the second embodiment of the present invention.

FIG. 12 is a flow chart showing a second operating process of the fingerprint detecting apparatus of FIG. 9, and FIG. 13 is a histogram showing multiple pixel numbers with the finger so as to illustrate a step S212 and a step S214 of FIG. 12. With reference to FIGS. 10 and 12, the second operating process contains the step S200, the step S202, the step S204, the step S206, the step S208, and the step S210. However, the step S212 is executed after the step S204 in the second operating process of FIG. 7. The image histogram index unit 14 distributes the multiple grayscale values into a plurality of groups and calculates a sum of pixel numbers of each group. As shown in FIG. 13, a first group gr1 includes a first grayscale value gb1 and a second grayscale value gb2 which have a first pixel number Pr1=Pb1+Pb2, a second group gr2 includes a third grayscale value gb3 and a fourth grayscale value gb4 which have a second pixel number Pr2=Pb3+Pb4, a third group gr3 includes a fifth grayscale value gb5 and a sixth grayscale value gb6 which have a third pixel number Pr3=Pb5+Pb6, and a fourth group gr4 includes a seventh grayscale value gb7 and an eighth grayscale value gb8 which have a fourth pixel number Pr4=Pb7+Pb8. In the step S214, the multiple grayscale values are accumulated from a highest grayscale value to a lowest grayscale value of the multiple grayscale values so as to produce a grand total Ps until the grand total Ps is more than first preset value TH3, wherein a specific grayscale value is selected from a last accumulated group of the first, second, third, and fourth groups to be the last accumulated grayscale value GA_black. For example, the image histogram index unit 14 accumulates the first, second, third, and fourth pixel numbers from the lowest grayscale value of the first group gr1, when the grand total Ps=Pr1+Pr2>TH3, and one (such as gb4) of the third grayscale value gb3 and the fourth grayscale gb4 of the last accumulated group g2 is selected to be the last accumulated grayscale value GA_black. Referring further to FIG. 12, the step S208 is executed after the step S214 of FIG. 10.

The fingerprint detecting apparatus of FIGS. 4 and 9 are used independently or together. When the fingerprint detecting apparatus are used together, the offset calculation unit 16 and the parameter selecting unit 24 are connected together.

Figure 14:
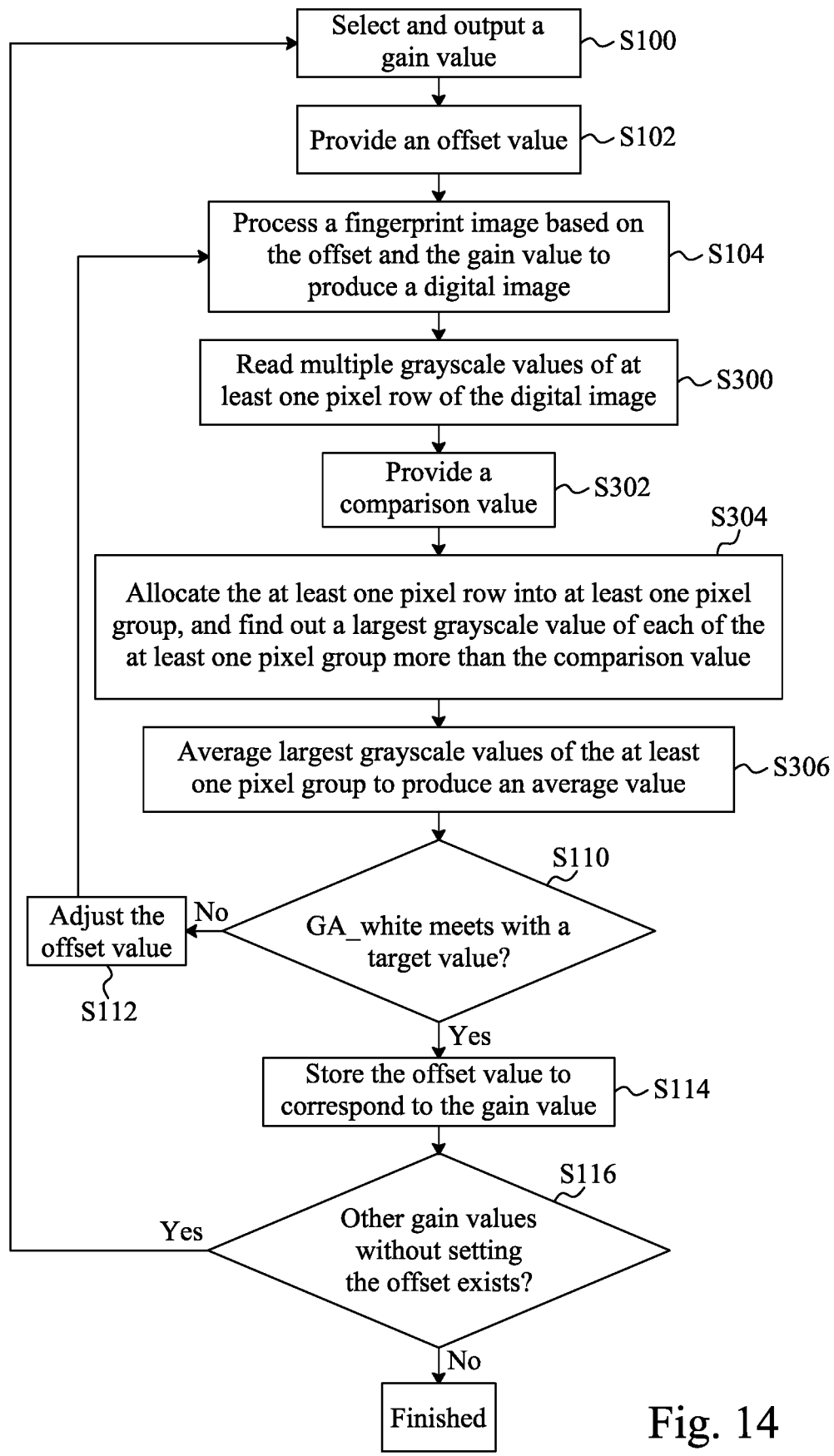
FIG. 14 is a flow chart showing a third operating process of the fingerprint detecting apparatus of FIG. 4 according to the second embodiment of the present invention.

FIG. 14 is the flow chart showing a third operating process of the fingerprint detecting apparatus. Referring to FIG. 15, the digital image 30 includes multiple pixel rows r1 to r7, and each of the multiple pixel rows r1 to r7 has multiple pixels 32. FIG. 16 is a schematic view showing multiple grayscale values of the multiple pixels of some of the multiple pixel rows r3, r4, r5. The step S100 to the step S104 of FIG. 14 is executed the same as those of FIG. 5 so as to produce the digital image, and the image histogram index unit 14 reads the multiple grayscale values of at least one pixel row of the digital image 30 in a step S300. As shown in FIG. 6, the multiple grayscale values of the third pixel row r3, the fourth pixel row r4, and the fifth pixel row r5 are read. A step S302 is executed after the step S300 so as to provide a comparison value CV which is preset or is produced by the image histogram index unit 14 on the basis of the digital image 30, for example, the image histogram index unit 14 averages the multiple grayscale values of the second pixel row r2 of the digital image 30 so as to produce the comparison value CV and executes the step S304 in which the third pixel row r3, the fourth pixel row r4, and the fifth pixel row r5 are allocated into at least one pixel group, and a largest grayscale value of each pixel group more than the comparison value CV is found out. As illustrated in FIG. 12, the third pixel row r3 to the fifth pixel row r5 are divided into three pixel groups respectively, and each of the three pixel groups has multiple grayscale values of four pixels, and each pixel group corresponds to a memory.

With reference to FIG. 16, in the step S304, the image histogram index unit 14 reads four grayscale values L1, H1, L2, H2 of the first pixel group of the third pixel row r3, wherein a first grayscale value L1 and the third grayscale value L2 are eliminated because they are less than the comparison value CV. When the second grayscale value H1 is more than the comparison value CV, the image histogram index unit 14 stores the second grayscale value H1 to the memory corresponding to the first pixel group. When the fourth grayscale value H2 is more than the comparison value CV, the image histogram index unit 14 compares the fourth grayscale value H2 with the second grayscale value H1. When the fourth grayscale value H2 is more than the second grayscale value H1, the fourth grayscale value H2 is stored into the memory so as to replace the second grayscale value H1. Thereafter, the image histogram index unit 14 reads a fifth grayscale value L3, a sixth grayscale value H3, a seventh grayscale value L4, and an eighth grayscale value H4 of the second pixel group of the third pixel row r3. When the fifth grayscale value L3 and the seventh grayscale value L4 are less than the comparison value CV, they are discarded. When the sixth grayscale value H3 is more than the comparison value H3, the image histogram index unit 14 stores the sixth grayscale value H3 to the memory corresponding to the second pixel group. When the eighth grayscale value H4 is more than the comparison value CV, the image histogram index unit 14 stores the eighth grayscale value H4 to the memory so as to be compared with the sixth grayscale value H3. When the eighth grayscale value H4 is less than the sixth grayscale value H3, it is eliminated, and the sixth grayscale value H3 is stored in the memory. Accordingly, the image histogram index unit 14 acquires largest grayscale values of the multiple pixel groups of the third, fourth, fifth pixel rows r3, r4, r5 respectively. Preferably, each pixel group is stored in the memory, thus reducing the consumption and a cost of the memory. Preferably, the image histogram index unit 14 acquires the largest grayscale value quickly after reading the multiple grayscale values, hence the fingerprint detecting apparatus operates efficiently.

After obtaining the fourth grayscale value H2, the sixth grayscale value H3, a ninth grayscale value H5, a tenth grayscale value H8, an eleventh grayscale value H9, a twelfth grayscale value H10, a thirteenth grayscale value H11, a fourteenth grayscale value H14, a fifteenth grayscale value H16, and a sixteenth grayscale value H17 which are a largest value of each pixel group, the histogram indicator unit 14 averages above-mentioned grayscale values in a step S306 so as to produce an average value GA_white. Thereafter, the step S110 is executed so that the offset calculation unit 16 determines whether the average value GA_white meets the target value GT1. When the average value GA_white does not meet the target value GT1, the step S112 is executed in which the calculation unit 16 adjusts the offset ADC_OFS. For example, the offset calculation unit 16 reduces or increases the offset ADC_OFS by one unit, when the acreage value GA_white is more than or less than the target value GT1. Alternatively, the offset calculation unit 16 adjusts the offset ADC_OFS based on a deviation between the average value GA_white and the target value GT1, wherein the step S104 to the step S110 is executed repeatedly after adjusting the offset ADC_OFS. When the average value GA_white meets the target value GT1, the step S114 is executed. The offset calculation unit 16 stores the offset ADC_OFS to the offset table so as to correspond to the multiple gain values ADC_GAIN. Thereafter, the step S116 is executed the same as that of FIG. 5.

Figure 17:
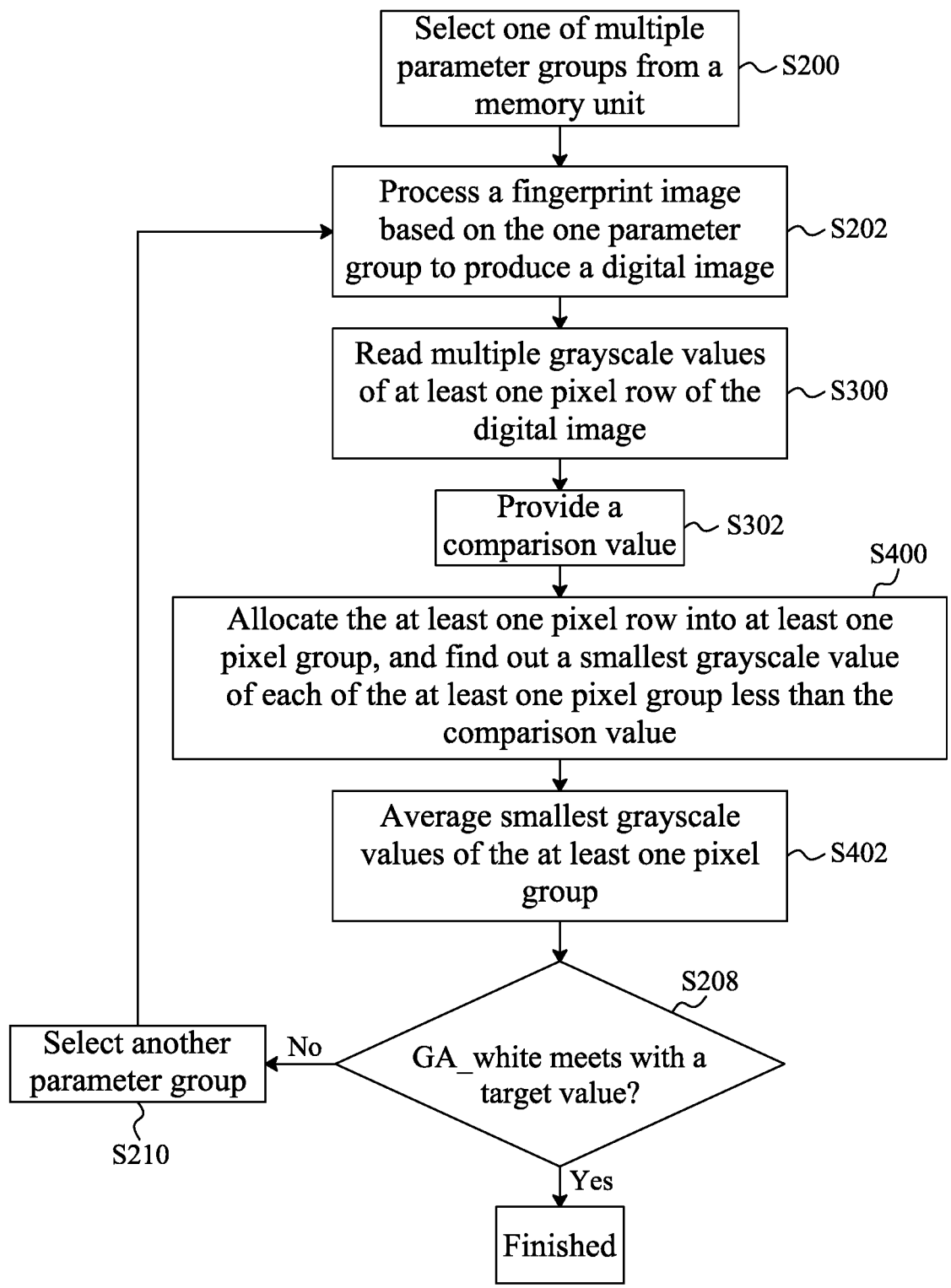
FIG. 17 is a flow chart showing the third operating process of the fingerprint detecting apparatus of FIG. 9 according to the second embodiment of the present invention.

FIG. 17 is a flow chart showing the third operating process of the fingerprint detecting apparatus. As illustrated in FIGS. 9 and 15-17, the step S200 and the step S202 of FIG. 10 are executed to produce the digital image. As shown in FIG. 14, the step S300 and the step S302 are executed to read the multiple grayscale values of the at least one pixel row of the digital image 30 and to provide the comparison value CV. With reference to FIG. 16, the image histogram index unit 14 reads the multiple grayscale values of the third pixel row r3, the fourth pixel row r4, and the fifth pixel row r5. Referring to FIG. 17, the third pixel row r3, the fourth pixel row r4, and the fifth pixel row r5 are allocated into the at least one pixel group. As illustrated in FIG. 16, the third pixel row r3 to the fifth pixel row r5 are divided into three pixel groups respectively, and each of the three pixel groups has multiple grayscale values of four pixels, and each pixel group corresponds to a memory. A difference of a step S400 of FIG. 17 from the step S304 of FIG. 14 contains acquiring a smallest value of the multiple grayscale values of each pixel group in the step S400, wherein the smallest value is less than the comparison value CV. After acquiring a first smallest value L1, a second smallest value L4, a third smallest value L6, a fourth smallest value L7, a fifth smallest value L9, a sixth smallest value L12, a seventh smallest value L13, an eighth smallest value L16, and a ninth smallest value L18, the image histogram index unit 14 averages the above-mentioned smallest values to obtain an average value GA_black in the step S402. Thereafter, in the step S208, the parameter selecting unit 24 determines whether the average value GA_black=gb4 meets the target value GT2, wherein when the average value GA_black does not meet the target value GT2, the parameter selecting unit 24 adjusts the selection signal T_SEL so that the memory unit 10 sends another parameter group in the step S210, and the step S202 to the step S208 of FIG. 13 is executed repeatedly. When the average value GA_black is more than the target value GT2, it denotes that the fingerprint is too shallow, and the selection signal T_SEL is adjusted so that the memory unit 10 sends a parameter group ADC_GAIN and ADC_OFS of high magnification. When the average value GA_black is less than the target value GT2, it represents the fingerprint is too deep, and that an average value GA_black of low magnification is selected. When the average value GA_black is exactly or is nearly equal to the target value GT2, the parameter selecting unit 24 stops adjusting the selection signal T_SEL.

Figure 18:
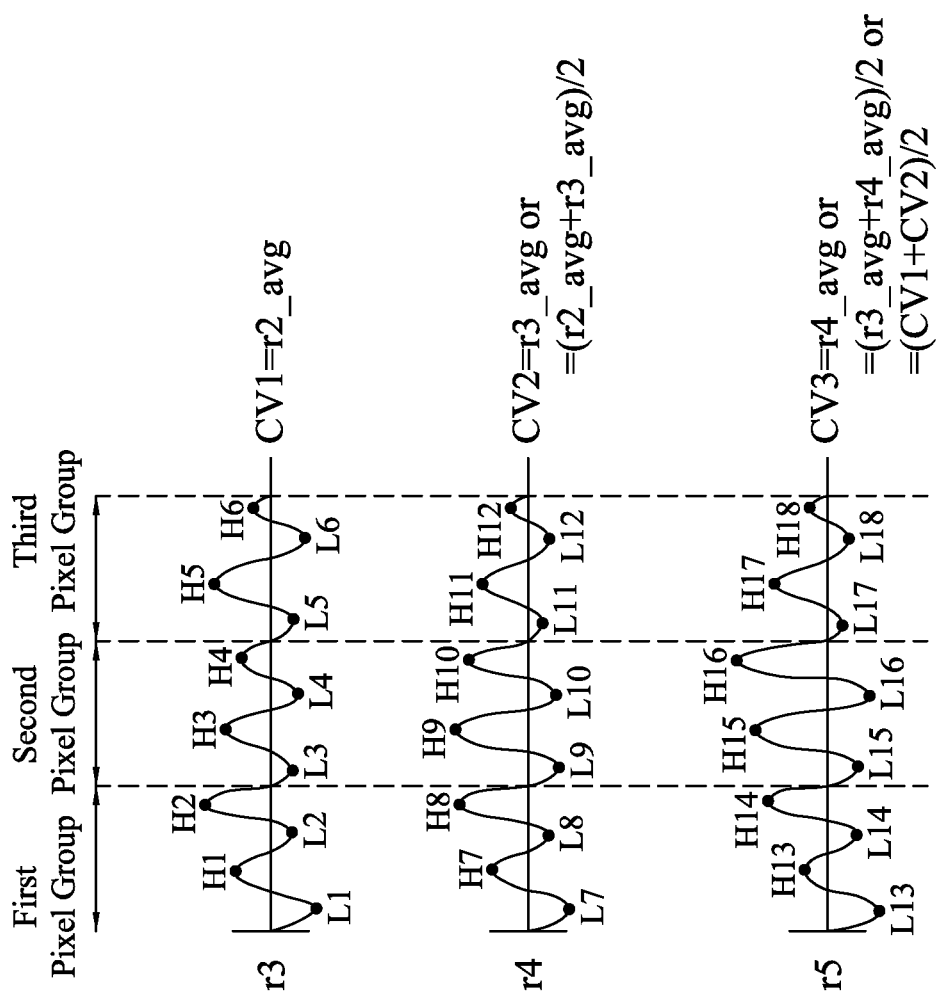
FIG. 18 is a schematic view showing multiple greyscale values of the multiple pixels of some of the multiple pixel rows r2, r3, r4, r5 according to an embodiment of the present invention.

As illustrated in FIG. 16, the third, fourth, fifth pixel rows r3, r4, r5 are compared with the comparison value CV. As shown in FIG. 18, the second, third, fourth, fifth pixel rows r2, r3, r4, r5 are compared with three comparison value CV1, CV2, CV3 respectively, wherein the three comparison values CV1, CV2, CV3 are preset or are produced based on the digital image 30. For example, calculating the average value of entire or a part of the multiple grayscale values of the third, fourth, fifth pixel rows to be the three comparison values, wherein an average value r2_avg of the multiple grayscale values of the second pixel row r2 is calculated and is used as a first comparison value CV1 of the third pixel row r3; an average value r3_avg of the entire grayscale values of the third pixel row r3 is calculated and is used as a second comparison value CV2 of the fourth pixel row r4. Alternatively, the average value r2_avg of the second pixel row r2 and the average value r3_avg of the third pixel row r3 are averaged, such as (r2_avg+r3_avg)/2). An average value r4_avg of the entire grayscale values of the fourth pixel row r4 is calculated and is used as a third comparison value CV3 of the fifth pixel row r5. Alternatively, the average value r3_avg of the third pixel row r3 and the average value r4_avg of the fourth pixel row r4 are averaged, such as (r3_avg+r4_avg)/2). Furthermore, as shown in FIG. 18, the entire or a part of the three comparison values are averaged to be the comparison value of each pixel row. For instance, the third comparison value CV3 of the fifth pixel row r5 is an average value (i.e., (CV1+CV2)/2) of the first comparison value CV1 of the third pixel row r3 and the second comparison value CV2 of the fourth pixel row r4.

While the preferred embodiments of the present invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A fingerprint detecting apparatus comprising:
   a memory unit;
   an image digitizing unit connected to the memory unit and processing a fingerprint image so as to produce a digital image based on an offset value and a gain value provided by the memory unit; and
   an image histogram index unit connected to the image digitizing unit to count multiple pixel numbers of multiple grayscale values of the digital image, wherein the multiple grayscale values have the multiple pixel numbers respectively, and the multiple pixel numbers of the multiple grayscale values are accumulated from a highest grayscale value to a lowest grayscale value or from the lowest grayscale value to the highest grayscale value so as to produce a cumulative value until the cumulative value is more than a first preset value and a pixel number of a last accumulated grayscale value is more than a second preset value, wherein the accumulated grayscale value is configured to adjust the offset, thus enhancing a quality of the digital image.

2. The fingerprint detecting apparatus of claim 1, further comprising an offset calculation unit connected to the image histogram index unit, wherein when the cumulative value of the multiple grayscale values does not meet a target value, the offset calculation unit adjusts the offset value, when the cumulative value meets the target value, the offset value is stored in the memory unit to correspond to the gain value.

3. The fingerprint detecting apparatus of claim 1, wherein the offset value has an initial value equal to zero.

4. A fingerprint detecting method comprising the steps of:
   A. providing an offset value and a gain value;
   B. processing a fingerprint image based on the offset value and the gain value to produce a digital image;
   C. counting multiple grayscale values of multiple grayscale of the digital image, wherein the multiple grayscale values have the multiple pixel numbers respectively;
   D. accumulating the multiple pixel numbers of the multiple grayscale values from a highest grayscale value to a lowest grayscale value or from the lowest grayscale value to the highest grayscale value so as to produce a cumulative value until the cumulative value is more than a first preset value and a pixel number of a last accumulated grayscale value is more than a second preset value; and
   E. adjusting the offset value based on the last accumulated grayscale value, thus enhancing a quality of the digital image.

5. The fingerprint detecting method of claim 4, wherein in the step E, when the last accumulated grayscale value does not meet a target value, the offset value is adjusted and the step B to the step E is executed repeatedly; and when the last accumulated grayscale value meets the target value, the offset value is stored to correspond to the gain value.

6. The fingerprint detecting method of claim 4, further comprising the step of setting an initial value of the offset value to zero.

7. A fingerprint detecting apparatus comprising:
   a memory unit;
   an image digitizing unit connected to the memory unit and processing a fingerprint image so as to produce a digital image based on an offset value and a gain value provided by the memory unit; and
   an image histogram index unit connected to the image digitizing unit to count multiple pixel numbers of multiple grayscale values of the digital image, wherein the multiple grayscale values have the multiple pixel numbers respectively, the multiple grayscale values are distributed into a plurality of groups, and a sum of pixel numbers of each of the plurality of groups is calculated, wherein the pixel numbers of the plurality of groups are accumulated from a highest grayscale value to a lowest grayscale value or from the lowest grayscale value to the highest grayscale value so as to produce a cumulative value until the cumulative value is more than a preset value, wherein a specific grayscale value is selected from a last accumulated group of the plurality of groups to adjust the offset value, thus enhancing a quality of the digital image.

8. The fingerprint detecting apparatus of claim 7, further comprising an offset calculation unit connected to the image histogram index unit, wherein when the cumulative value of the multiple grayscale values does not meet a target value, the offset calculation unit adjusts the offset value, when the specific grayscale value meets the target value, the offset value is stored in the memory unit to correspond to the gain value.

9. The fingerprint detecting apparatus of claim 7, wherein the offset value has an initial value equal to zero.

10. A fingerprint detecting method comprising the steps of:
   A. providing an offset value and a gain value;
   B. processing a fingerprint image based on the offset value and the gain value to produce a digital image;
   C. counting multiple pixel numbers of multiple grayscale values of the digital image, wherein the multiple grayscale values have the multiple pixel numbers respectively;
   D. distributing the multiple grayscale values into a plurality of groups, and calculating a sum of pixel numbers of each of the plurality of groups;
   E. accumulating the pixel numbers of the plurality of groups from a highest grayscale value to a lowest grayscale value or from the lowest grayscale value to the highest grayscale value so as to produce a cumulative value until the cumulative value is more than a preset value, wherein a specific grayscale value is selected from a last accumulated group of the plurality of groups; and
   F. adjusting the offset value based on the specific grayscale value, thus enhancing a quality of the digital image.

11. The fingerprint detecting method of claim 10, wherein in the step F, when the specific grayscale value does not meet a target value, the offset value is adjusted and the step B to the step F is executed repeatedly; and when the specific grayscale value meets the target value, the offset value is stored to correspond to the gain value.

12. The fingerprint detecting method of claim 10, further comprising the step of setting an initial value of the offset value to zero.

13. A fingerprint detecting apparatus comprising:
   a memory unit configured to store multiple parameter groups and to send one of the multiple parameter groups based on a selection signal, wherein each of the multiple parameter groups has a gain value and an offset value;
   an image digitizing unit connected to the memory unit and processing a fingerprint image so as to produce a digital image based on the one parameter group sent from the memory unit; and
   an image histogram index unit connected to the image digitizing unit to count multiple pixel numbers of multiple grayscale values of the digital image, wherein the multiple grayscale values have the multiple pixel numbers respectively, and the multiple pixel numbers of the multiple grayscale values are accumulated from a highest grayscale value to a lowest grayscale value or from the lowest grayscale value to the highest grayscale value so as to produce a cumulative value until the cumulative value is more than a first preset value and a pixel number of a last accumulated grayscale value is more than a second preset value, wherein the accumulated grayscale value is configured to control the selection signal and to control the memory unit to send the one parameter group, thus enhancing a quality of the digital image.

14. The fingerprint detecting apparatus of claim 13, further comprising a parameter selecting unit connected to the memory unit and the image histogram index unit and configured to output the selection signal, wherein when the last accumulated grayscale value does not meet a target value, the parameter selecting unit adjusts the selection signal so that the memory unit sends another parameter group when the last accumulated grayscale value is more than or less than the target value.

15. A fingerprint detecting method comprising the steps of:
   A. selecting one of multiple parameter groups, wherein each of the multiple parameter groups has a gain value and an offset value;
   B. processing a fingerprint image based on the one parameter group to produce a digital image;
   C. counting multiple pixel numbers of multiple grayscale values of the digital image, wherein the multiple grayscale values have the multiple pixel numbers respectively;
   D. accumulating the multiple pixel numbers of the multiple grayscale values from a highest grayscale value to a lowest grayscale value or from the lowest grayscale value to the highest grayscale value so as to produce a cumulative value until the cumulative value is more than a first preset value and a pixel number of a last accumulated grayscale value is more than a second preset value; and
   E. determining whether the last accumulated grayscale value meets with a target value, wherein when the last accumulated grayscale value does not meet the target value, another parameter group of the multiple parameter groups is selected to produce the digital image, thus enhancing a quality of the digital image.

16. The fingerprint detecting method of claim 15, wherein in the step E, another parameter group of the multiple parameter groups is selected, and the step B to the step E is executed repeatedly.

17. The fingerprint detecting method of claim 15, wherein in the step E, when the last accumulated grayscale value does not meet the target value, another parameter group is selected when the last accumulated grayscale value is more than or less than the target value.

18. A fingerprint detecting apparatus comprising:
   a memory unit configured to store multiple parameter groups and to send one of the multiple parameter groups based on a selection signal, wherein each of the multiple parameter groups has a gain value and an offset value;
   an image digitizing unit connected to the memory unit and processing a fingerprint image so as to produce a digital image based on the one parameter group sent from the memory unit; and
   an image histogram index unit connected to the image digitizing unit to count multiple pixel numbers of multiple grayscale values of the digital image, wherein the multiple grayscale values have the multiple pixel numbers respectively, the multiple grayscale values are distributed into a plurality of groups, and a sum of pixel numbers of each of the plurality of groups is calculated, wherein the pixel numbers of the plurality of groups are accumulated from a highest grayscale value to a lowest grayscale value or from the lowest grayscale value to the highest grayscale value so as to produce a cumulative value until the cumulative value is more than a preset value, wherein a specific grayscale value is selected from a last accumulated group of the plurality of groups to control the selection signal and to control the memory unit to send the one parameter group, thus enhancing a quality of the digital image.

19. The fingerprint detecting apparatus of claim 18, further comprising a parameter selecting unit connected to the memory unit and the image histogram index unit and configured to output the selection signal, wherein when the specific grayscale value does not meet a target value, the parameter selecting unit adjusts the selection signal so that the memory unit sends another parameter group when the specific grayscale value is more than or less than the target value.

20. A fingerprint detecting method comprising the steps of:
  A. selecting one of multiple parameter groups, wherein each of the multiple parameter groups has a gain value and an offset value;
  B. processing a fingerprint image based on the one parameter group to produce a digital image;
  C. counting multiple pixel numbers of multiple grayscale values of the digital image, wherein the multiple grayscale values have the multiple pixel numbers respectively;
  D. distributing the multiple grayscale values into a plurality of groups, and calculating a sum of pixel numbers of each of the plurality of groups;
  E. accumulating the pixel numbers of the plurality of groups from a highest grayscale value to a lowest grayscale value or from the lowest grayscale value to the highest grayscale value so as to produce a cumulative value until the cumulative value is more than a preset value, wherein a specific grayscale value is selected from a last accumulated group of the plurality of groups; and
  F. determining whether the specific grayscale value meets a target value, wherein when the specific grayscale value does not meet a target value, another of the multiple parameter groups is selected to produce the digital image, thus enhancing a quality of the digital image.

21. The fingerprint detecting method of claim 20, wherein in the step F, another parameter group is selected from the multiple parameter groups and the step B to the step F is executed repeatedly.

22. The fingerprint detecting method of claim 20, wherein in the step F, when the specific grayscale value does not meet the target value, another parameter group is selected from the multiple parameter groups when the specific grayscale value is more than or less than the target value.

23. A fingerprint detecting apparatus comprising:
  a memory unit;
  an image digitizing unit connected to the memory unit and processing a fingerprint image so as to produce a digital image based on an offset value and a gain value provided by the memory unit; and
  an image histogram index unit connected to the image digitizing unit to read multiple grayscale values of at least one pixel row of the digital image, wherein the at least one pixel row is allocated into at least one pixel group, and a largest grayscale value of each of the at least one pixel group more than a comparison value is found out, and largest grayscale values of the at least one pixel group are averaged to produce an average value configured to adjust the offset value, thus enhancing a quality of the digital image.

24. The fingerprint detecting apparatus of claim 23, further comprising an offset calculation unit connected to the image histogram index unit, wherein when the average value does not meet a target value, the offset value is adjusted, and when the average value meets the target value, the offset value is stored to the memory unit so as to correspond to the gain value.

25. The fingerprint detecting apparatus of claim 23, wherein the image histogram index unit calculates an average value of entire or a part of the multiple grayscale values of the at least one pixel row to be the comparison value.

26. The fingerprint detecting apparatus of claim 23, wherein the image histogram index unit calculates an average value of entire or a part of comparison values of the at least one pixel row to be the comparison value of the at least one pixel row.

27. The fingerprint detecting apparatus of claim 23, wherein the offset value has an initial value equal to zero.

28. A fingerprint detecting method comprising the steps of:
  A. providing an offset value and a gain value;
  B. processing a fingerprint image based on the offset value and the gain value to produce a digital image;
  C. reading multiple grayscale values of at least one pixel row of the digital image;
  D. allocating the at least one pixel row into at least one pixel group, and finding out a largest grayscale value of each of the at least one pixel group more than a comparison value;
  E. averaging largest grayscale values of the at least one pixel group; and
  F. enhancing a quality of the digital image after averaging the largest grayscale values of the at least one pixel group.

29. The fingerprint detecting method of claim 28, wherein in the step D, an average value of entire or a part of the multiple grayscale values of the at least one pixel row is calculated to be the comparison value of the at least one pixel row.

30. The fingerprint detecting method of claim 28, wherein in the step D, an average value of entire or a part of comparison values of the at least one pixel row is calculated to be the comparison value of the at least one pixel row.

31. The fingerprint detecting method of claim 28, wherein in the step D, when the average value does not meet a target value, the offset value is adjusted and the step B to the step F is executed repeatedly; and when the average value meets the target value, the offset value is stored to correspond to the gain value.

32. The fingerprint detecting method of claim 28, further comprising a step of setting an initial value of the offset value to zero.

33. A fingerprint detecting apparatus comprising:
  a memory unit configured to store multiple parameter groups and to send one of the multiple parameter groups based on a selection signal, wherein each of the multiple parameter groups has a gain value and an offset value;
  an image digitizing unit connected to the memory unit and processing a fingerprint image so as to produce a digital image based on the one parameter group sent from the memory unit; and
  an image histogram index unit connected to the image digitizing unit to read multiple grayscale values of at least one pixel row of the digital image, wherein the at least one pixel row is allocated into at least one pixel group, and a smallest grayscale value of each of the at least one pixel group less than a comparison value is found out, and smallest grayscale values of the at least one pixel group are averaged to control the selection signal and to control the memory unit to send the one parameter group, thus enhancing a quality of the digital image.

34. The fingerprint detecting apparatus of claim 33, further comprising a parameter selecting unit connected to the memory unit and the image histogram index unit and configured to output the selection signal, wherein when the average value does not meet a target value, the parameter selecting unit adjusts the selection signal so that the memory unit sends another parameter group when the average value is more than or less than the target value.

35. The fingerprint detecting apparatus of claim 33, wherein the image histogram index unit calculates an average value of entire or a part of the multiple grayscale values of the at least one pixel row to be the comparison value.

36. The fingerprint detecting apparatus of claim 33, wherein the image histogram index unit calculates an average value of entire or a part of comparison values of the at least one pixel row to be the comparison value of the at least one pixel row.

37. A fingerprint detecting method comprising the steps of:
   A. selecting one of multiple parameter groups, wherein each of the multiple parameter groups has a gain value and an offset value;
   B. processing a fingerprint image based on the one parameter group to produce a digital image;
   C. reading multiple grayscale values of at least one pixel row of the digital image;
   D. allocating the at least one pixel row into at least one pixel group, and finding out a smallest grayscale value of each of the at least one pixel group less than a comparison value;
   E. averaging smallest grayscale values of the at least one pixel group; and
   F. determining whether the average value meets a target value, wherein when the average value does not meet the target value, another of the multiple parameter groups is selected to produce the digital image, thus enhancing a quality of the digital image.

38. The fingerprint detecting method of claim 37, wherein in the step D, an average value of entire or a part of the multiple grayscale values of the at least one pixel row is calculated to be the comparison value of the at least one pixel row.

39. The fingerprint detecting method of claim 37, wherein in the step D, an average value of entire or a part of comparison values of the at least one pixel row is calculated to be the comparison value of the at least one pixel row.

40. The fingerprint detecting method of claim 37, wherein in the step F, another of the multiple parameter groups is selected and the step B to the step F is executed repeatedly.

41. The fingerprint detecting method of claim 37, wherein in the step F, when the average value does not meet the target value, another of the multiple parameter groups is selected when the average value is more than or less than the target value.

* * * * *